(12) United States Patent
Shiramizu et al.

(10) Patent No.: US 10,313,569 B2
(45) Date of Patent: Jun. 4, 2019

(54) IMAGE MEASUREMENT SYSTEM AND CONTROLLER

(71) Applicant: OMRON CORPORATION, Kyoto-shi, Kyoto (JP)

(72) Inventors: Gaku Shiramizu, Ayabe (JP); Yuki Taniyasu, Ritto (JP); Naoya Ochi, Yokohama (JP)

(73) Assignee: OMRON CORPORATION, Kyoto-shi, Kyoto (JP)

( * ) Notice: Subject to any disclaimer, the term of this patent is extended or adjusted under 35 U.S.C. 154(b) by 248 days.

(21) Appl. No.: 15/391,022

(22) Filed: Dec. 27, 2016

(65) Prior Publication Data
US 2017/0257540 A1 Sep. 7, 2017

(30) Foreign Application Priority Data

Mar. 7, 2016 (JP) .................. 2016-043191

(51) Int. Cl.
*H04N 5/225* (2006.01)
*H04N 5/232* (2006.01)
*G01B 11/25* (2006.01)

(52) U.S. Cl.
CPC ....... *H04N 5/2256* (2013.01); *G01B 11/2504* (2013.01); *G01B 11/2513* (2013.01); *H04N 5/23293* (2013.01); *H04N 5/23296* (2013.01)

(58) Field of Classification Search
CPC .................................................. H04N 5/2256
See application file for complete search history.

(56) References Cited

U.S. PATENT DOCUMENTS

| | | |
|---|---|---|
| 2002/0012064 A1 | 1/2002 | Yamaguchi |
| 2002/0047909 A1 | 4/2002 | Hatae et al. |
| 2010/0091301 A1 | 4/2010 | Masuda |

(Continued)

FOREIGN PATENT DOCUMENTS

| | | |
|---|---|---|
| JP | 07301513 A | 11/1995 |
| JP | 2001333329 A | 11/2001 |

(Continued)

OTHER PUBLICATIONS

Communication dated Jul. 4, 2017, issued by the European Patent Office in counterpart application No. 16206552.8.

(Continued)

*Primary Examiner* — James M Pontius
(74) *Attorney, Agent, or Firm* — Sughrue Mion, PLLC

(57) ABSTRACT

An image measurement system includes a controller, a projector for emitting illumination light in accordance with a radiation pattern, an imaging unit, and a display unit. The controller includes a display control module for displaying on a display unit an image of a field of view captured by the imaging unit in a state in which illumination light is emitted, a receiving module for receiving a setting of a mask area in association with the image displayed on the display unit, the mask area being an area in which the quantity of illumination light should be reduced compared with another area in the field of view, and an updating module for updating the radiation pattern in accordance with the set mask area, based on a correspondence in position between the radiation pattern of the projector and a projection pattern produced in the field of view by the radiation pattern.

14 Claims, 29 Drawing Sheets

(56) References Cited

U.S. PATENT DOCUMENTS

| | | | |
|---|---|---|---|
| 2010/0194291 A1 | 8/2010 | Ishiwata | |
| 2011/0002529 A1* | 1/2011 | Jeong | G01B 11/25 382/147 |
| 2013/0083384 A1 | 4/2013 | Yamagata et al. | |
| 2014/0071459 A1 | 3/2014 | Nakatsukasa | |
| 2014/0078490 A1 | 3/2014 | Higo et al. | |
| 2014/0152794 A1* | 6/2014 | Takahashi | G01B 11/24 348/79 |
| 2014/0354797 A1 | 12/2014 | Woo et al. | |

FOREIGN PATENT DOCUMENTS

| | | |
|---|---|---|
| JP | 2002204391 A | 7/2002 |
| JP | 2003148935 A | 5/2003 |
| JP | 2005214653 A | 8/2005 |
| JP | 2006275529 A | 10/2006 |
| JP | 2009-099510 A | 5/2009 |
| JP | 2010091491 A | 4/2010 |
| JP | 2012230097 A | 11/2012 |
| JP | 2013036791 A | 2/2013 |
| JP | 2014059261 A | 4/2014 |
| JP | 2015038466 A | 2/2015 |

OTHER PUBLICATIONS

Communication dated Oct. 2, 2018, from Japanese Patent Office in counterpart application No. 2016-043191.

* cited by examiner

SET MASK AREA

INFORMATION OF
LOW-REFLECTANCE AREA
IS NOT LOST

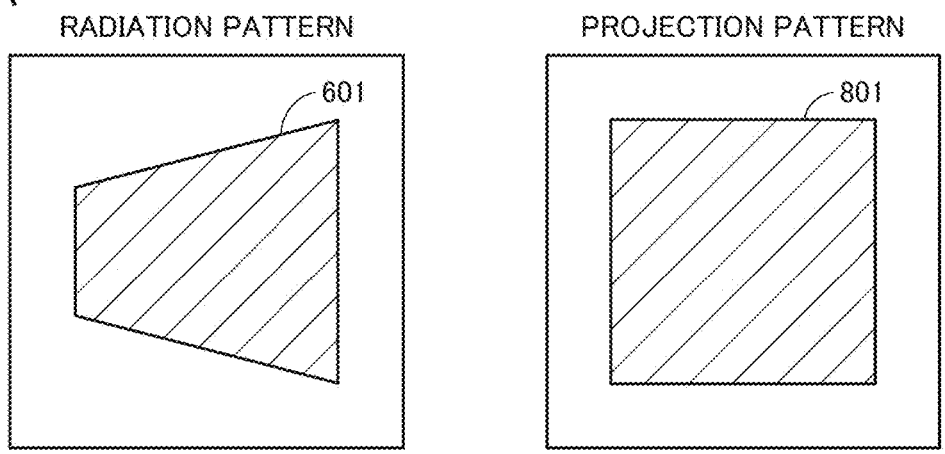
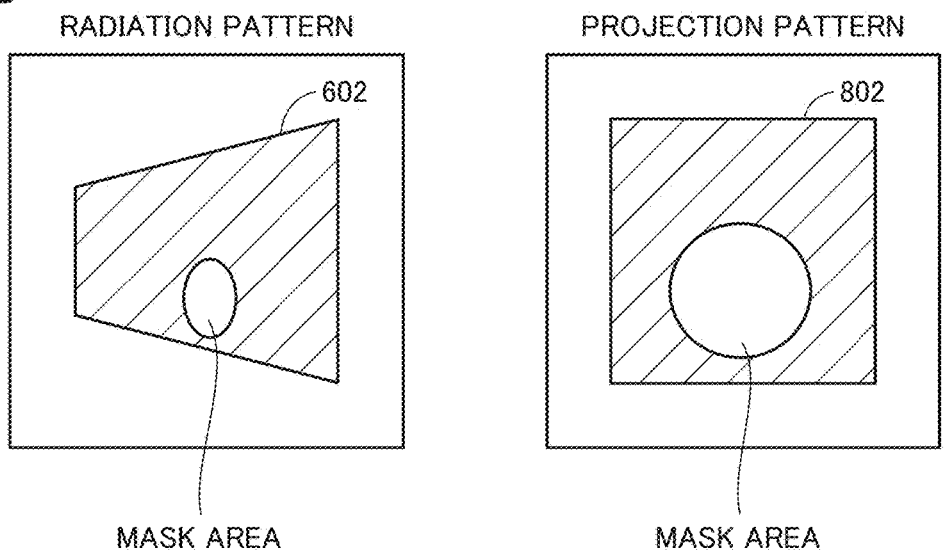

FIG.6A
REFERENCE RADIATION PATTERN 1
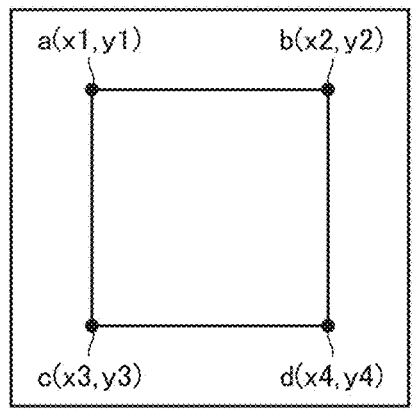
PROJECTION PATTERN 1
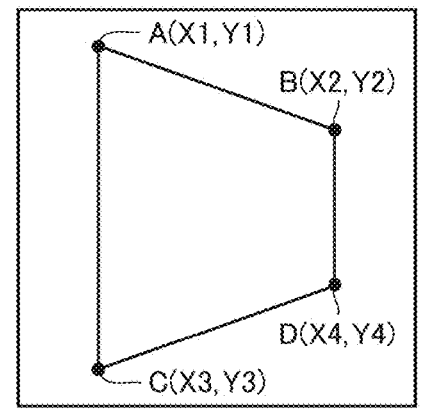
FIG.6B
REFERENCE RADIATION PATTERN 2
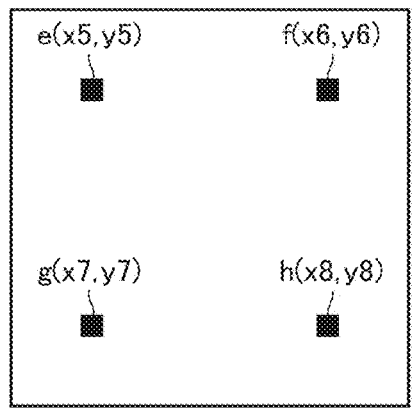
PROJECTION PATTERN 2
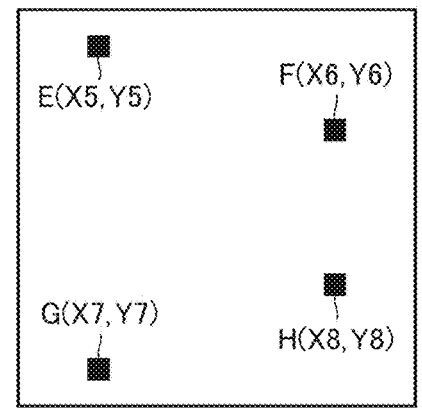

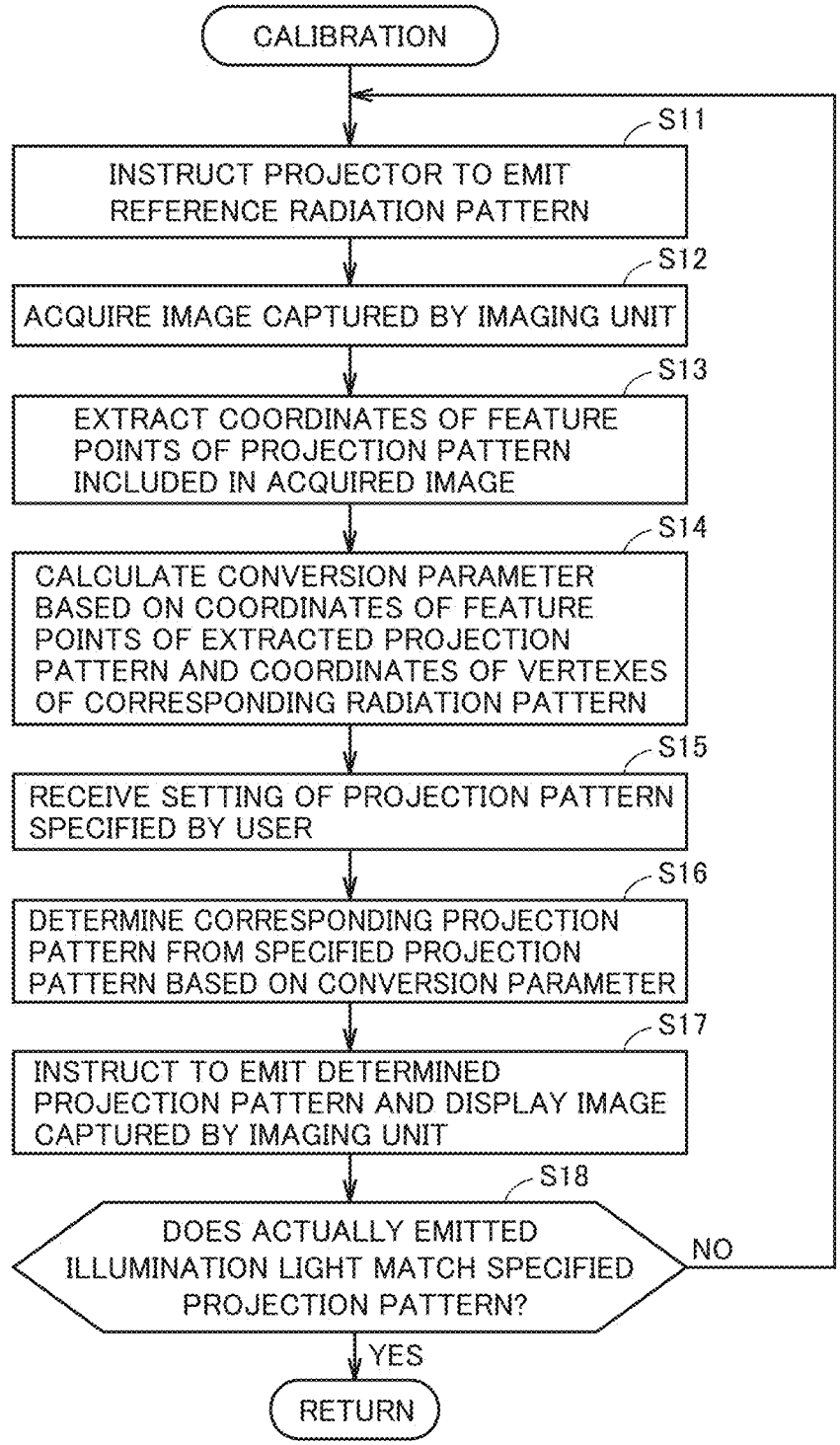

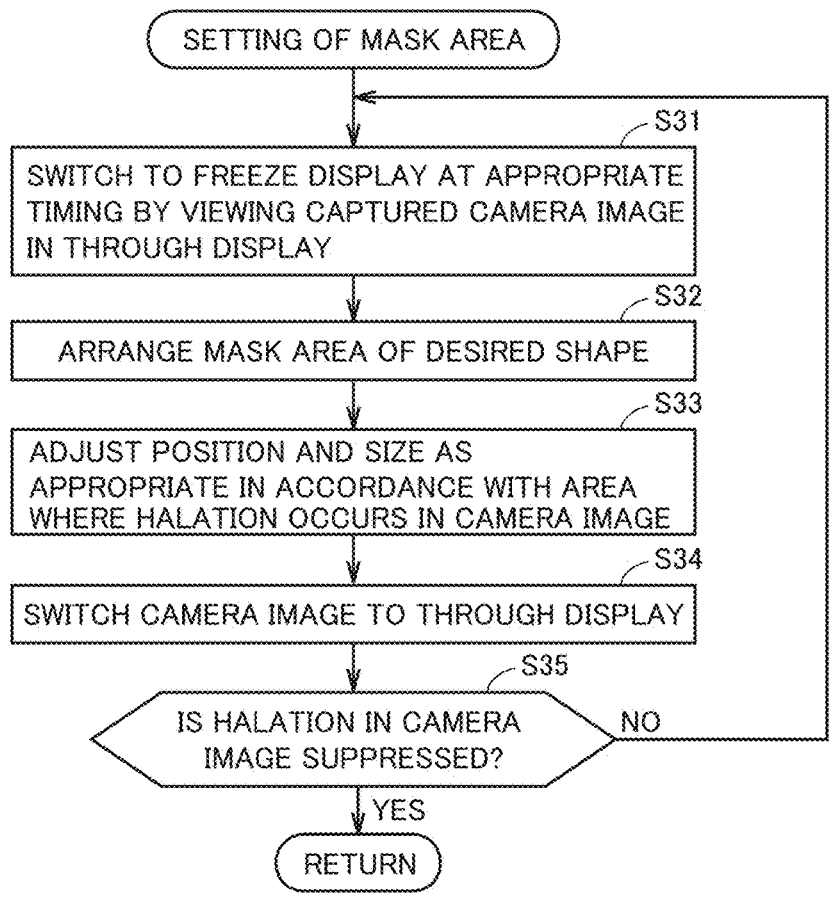

- LOW-REFLECTANCE MATERIAL
- HIGH-REFLECTANCE MATERIAL

- BLUR OF LIGHT
- ORIGINAL BOUNDARY OF MATERIALS

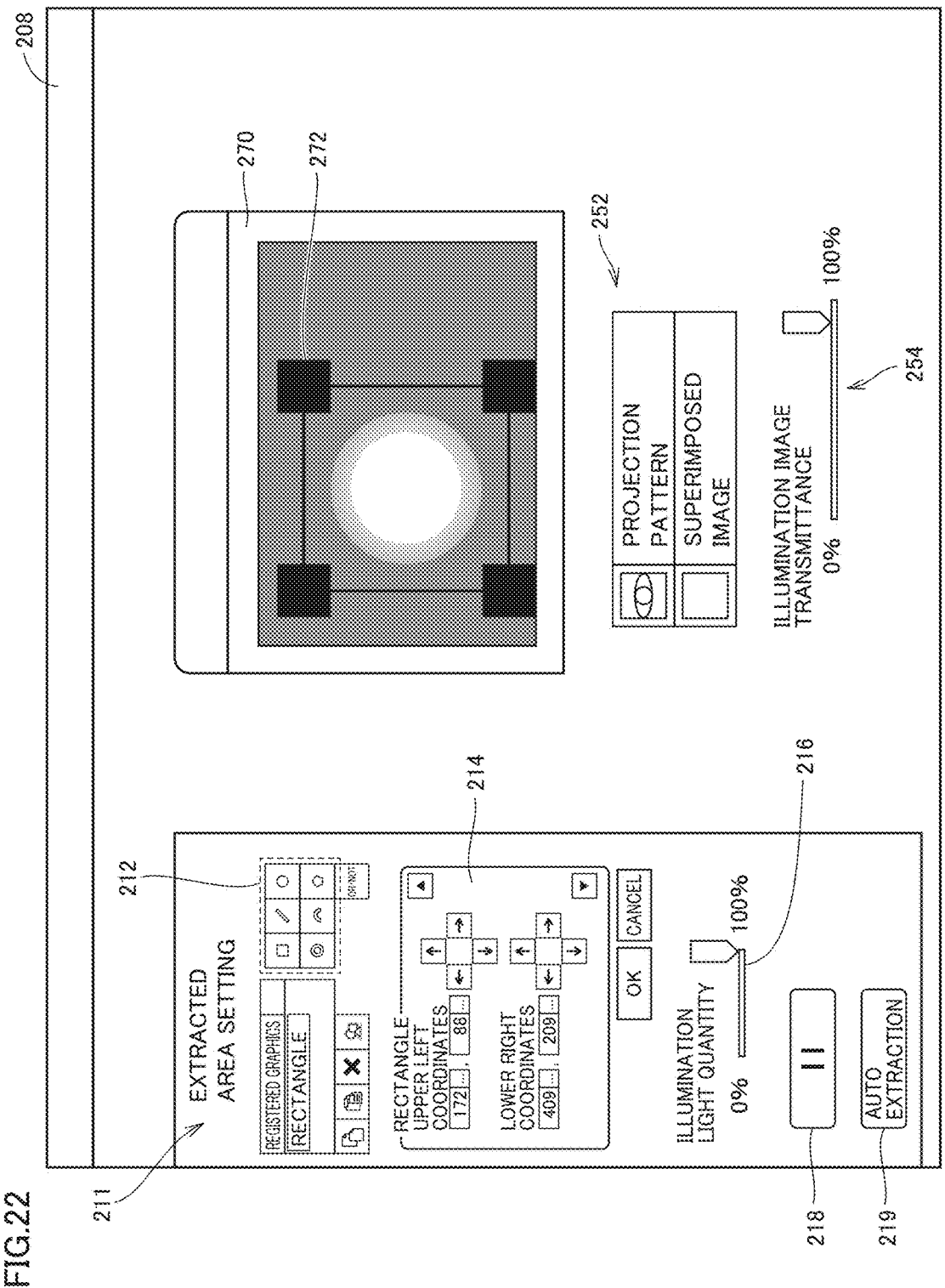

FIG.23A
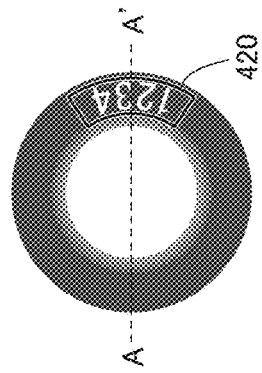
HDR IMAGING AS A WHOLE
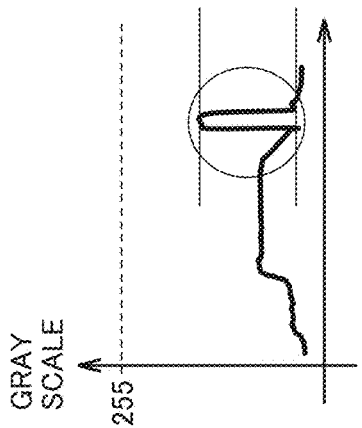
CONTRAST OF TEST AREA IS AFFECTED BY ENTIRE IMAGE AND REDUCED
FIG.23B
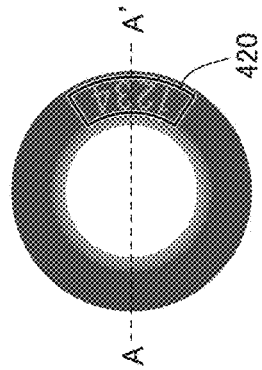
SPECIFY TEST AREA
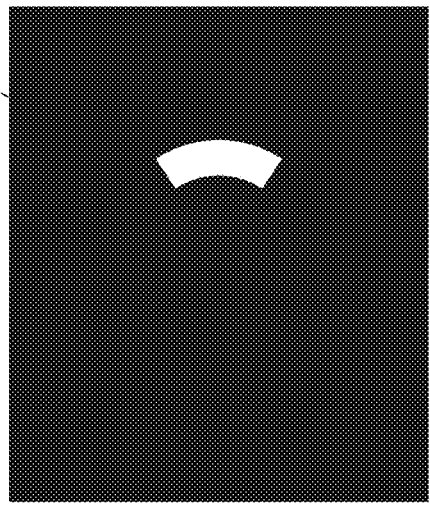
FORM MASK AREA ENTIRELY EXCEPT TEST AREA
FIG.23C
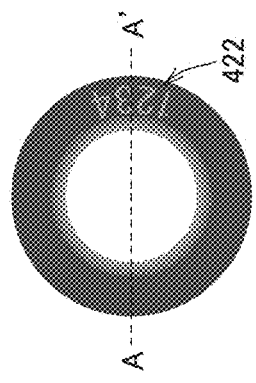
EMIT ILLUMINATION LIGHT TO TEST AREA ALONE(HDR)
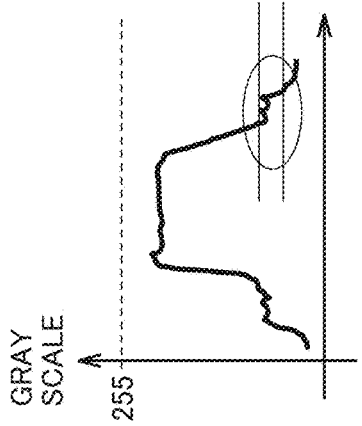
CONTRAST OF TEST AREA ALONE IS ENHANCED

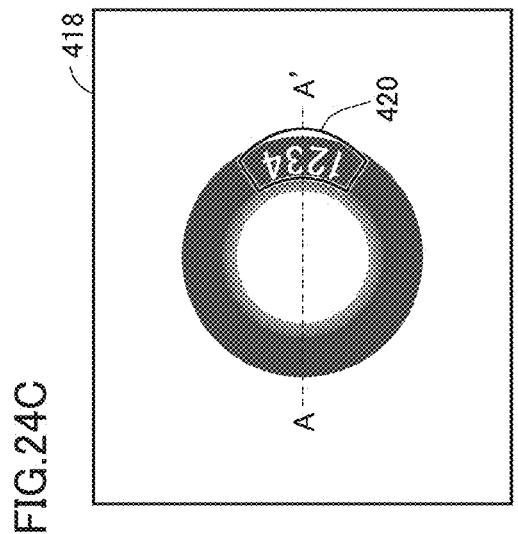
FIG.24A
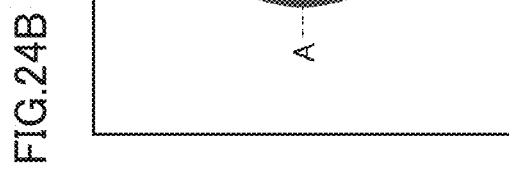
FIG.24B
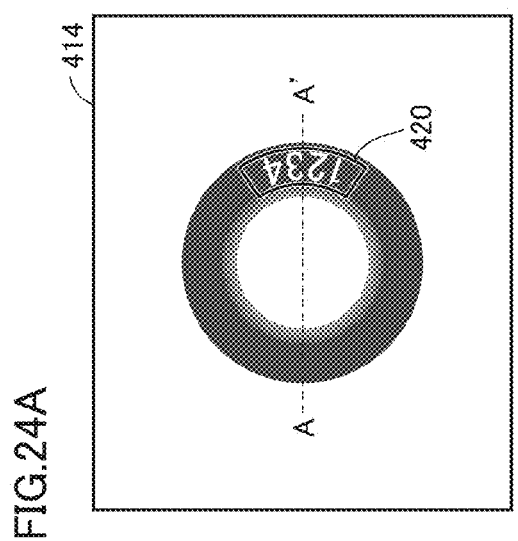
FIG.24C
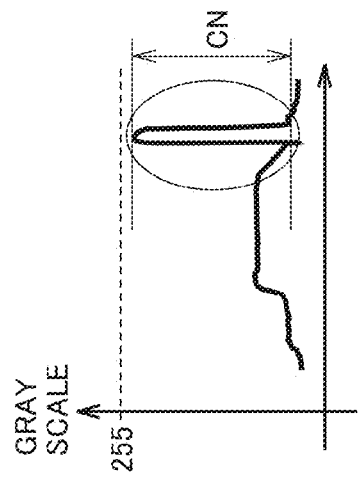
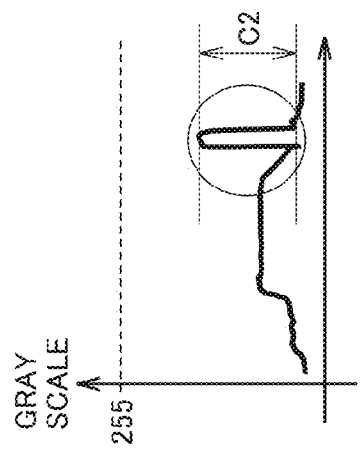
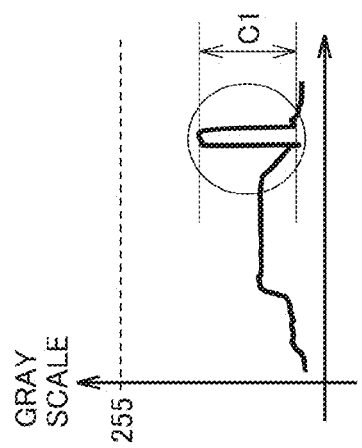
ADJUST AREA TO ACHIEVE HIGHEST CONTRAST IN TEST AREA

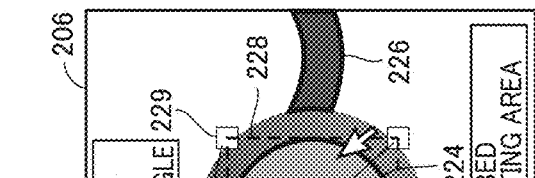
FIG.28A
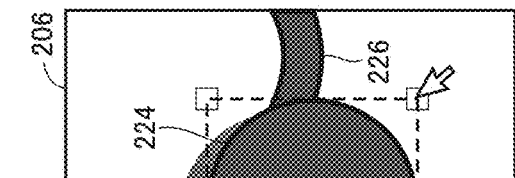
FIG.28B
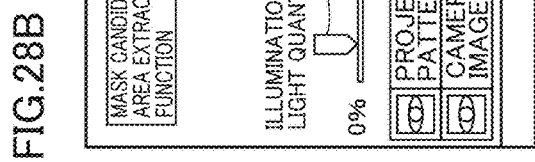
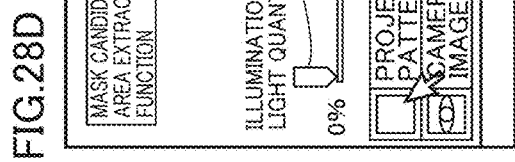
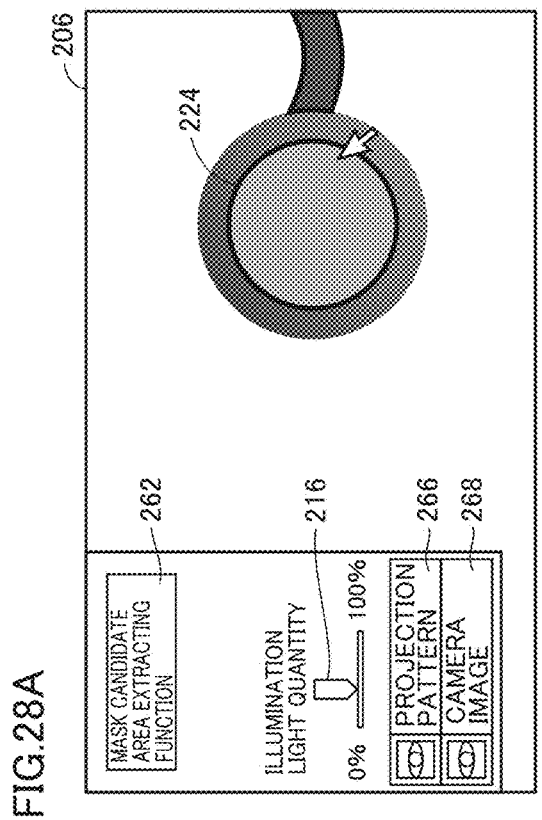
FIG.28C
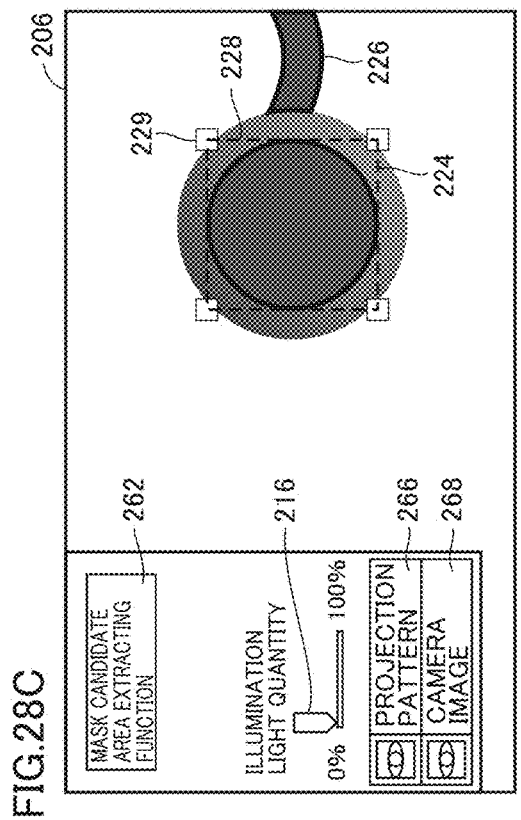
FIG.28D

IMAGE MEASUREMENT SYSTEM AND CONTROLLER

BACKGROUND OF THE INVENTION

Field of the Invention

The present technique relates to an image measurement system and a controller capable of changing illumination light in accordance with the specified radiation pattern.

Description of the Background Art

In the fields of FA (Factory Automation), automatic control technology using image measurement techniques has been widely used. For example, an automatic process of generating a variety of control commands is performed by capturing an image of an object such as a work and subjecting the captured image to image measurement processing such as pattern matching. Vision sensors that embody such image measurement techniques are often configured to emit appropriate illumination light to an object in order to increase the accuracy of image measurement by suppressing the effects of disturbance light.

An illumination apparatus is proposed, which, though not pertaining to the field of vision sensors, emits desired illumination light using a projector. For example, Japanese Patent Laying-Open No. 2009-099510 discloses an illumination apparatus which includes a projection-type projector as a light source for making the color of objects look vivid. The projection-type projector is used to achieve the effects such as making multiple colors included in an object look vivid.

SUMMARY OF THE INVENTION

The illumination apparatus disclosed in Japanese Patent Laying-Open No. 2009-099510 is aimed to make multiple colors included in the illuminated object look vivid and is not intended for use in vision sensors as described above.

The present technique provides an image measurement system and a controller included in the same to enable image measuring processing for a wider variety of objects using a projector capable of emitting desired illumination light.

An image measurement system according to an embodiment includes a controller, a projector for emitting illumination light in accordance with a radiation pattern specified from the controller, an imaging unit having a field of view in which an area irradiated with the illumination light exists, and a display unit adapted to display an image. The controller includes a display control module for displaying on the display unit an image of the field of view captured by the imaging unit in a state in which the illumination light is emitted, a receiving module for receiving setting of a mask area in association with the image displayed on the display unit, the mask area being an area in which the quantity of illumination light is to be reduced compared with another area in the field of view, and an updating module for updating the radiation pattern in accordance with the set mask area, based on a correspondence in position between the radiation pattern of the projector and a projection pattern produced in the field of view by the radiation pattern.

The display control module may display a screen showing the set mask area, in addition to the image of the field of view, in association with a screen of the image of the field of view.

The display control module may display an image obtained by combining the set mask area with the image of the field of view, in addition to the image of the field of view.

The display control module may selectively display the image of the field of view and an image obtained by combining the set mask area with the image of the field of view.

The receiving module may further receive a setting of magnitude of the quantity of illumination light emitted from the projector.

The receiving module may be configured to receive settings of a plurality of mask areas different from each other.

The receiving module may receive a setting of magnitude of the quantity of illumination light emitted from the projector, separately for each of the plurality of mask areas.

The receiving module may receive selection of a plurality of predefined shapes and receive specification of size and position of an area having the selected shape.

The image measurement system may further include an extracting module for extracting an area having a pixel value matching a predetermined condition in the image of the field of view, as a candidate for mask area.

The extracting module may determine the predetermined condition, based on each of images of the field of view captured in a state in which the quantity of illumination light emitted from the projector is varied into multiple levels.

The receiving module may receive an operation of changing a shape of the extracted candidate for mask area.

The receiving module may receive a setting of a test area and set an area except the test area in the field of view as a mask area, the test area being an area to be subjected to image measurement processing.

The controller may further include a combining module for generating a composite image by combining images captured under a plurality of imaging conditions in a state in which illumination light is emitted in accordance with a radiation pattern corresponding to the set mask area, and an optimizing module for optimizing size and/or position of the mask area by evaluating contrast of a composite image generated in a state in which illumination light is emitted in accordance with a radiation pattern corresponding to each mask area while at least one of size and position of the mask area is changed.

The controller may further include a determining module for allowing the projector to emit illumination light in accordance with a predetermined reference radiation pattern and determining the correspondence in the position, based on a projection pattern appearing in an image captured by the imaging unit.

An image measurement system according to another embodiment includes a controller, a projector for emitting illumination light in accordance with a radiation pattern specified from the controller, an imaging unit having a field of view in which an area irradiated with the illumination light exists, and a display unit adapted to display an image. The controller includes an extracting module for extracting an area including a pixel exceeding a predetermined luminance in an image of the field of view captured by the imaging unit in a state in which the illumination light is emitted, a determining module for determining a mask area based on the extracted area, the mask area being an area in which the quantity of illumination light is to be reduced compared with another area in the field of view, and an updating module for updating the radiation pattern in accordance with the determined mask area, based on a correspondence in position between the radiation pattern of the projector and a projection pattern produced in the field of view by the radiation pattern.

In accordance with yet another embodiment, a controller is provided for use in an image measurement system including a projector for emitting illumination light and an imaging unit having a field of view in which an area irradiated with the illumination light exists. The controller includes an illumination control module for instructing the projector to emit illumination light in accordance with a radiation pattern, a display control module for displaying on the display unit an image of the field of view captured by the imaging unit in a state in which the illumination light is emitted, a receiving module for receiving a setting of a mask area in association with the image displayed on the display unit, the mask area being an area in which the quantity of illumination light is to be reduced compared with another area in the field of view, and an updating module for updating the radiation pattern in accordance with the set mask area, based on a correspondence in position between the radiation pattern of the projector and a projection pattern produced in the field of view by the radiation pattern.

In accordance with yet another embodiment, a controller is provided for use in an image measurement system including a projector for emitting illumination light and an imaging unit having a field of view in which an area irradiated with the illumination light. The controller includes an illumination control module for instructing the projector to emit illumination light in accordance with a radiation pattern, an extracting module for extracting an area including a pixel exceeding a predetermined luminance in an image of the field of view captured by the imaging unit in a state in which the illumination light is emitted, a determining module for determining a mask area based on the extracted area, the mask area being an area in which the quantity of illumination light is to be reduced compared with another area in the field of view, and an updating module for updating the radiation pattern in accordance with the determined mask area, based on a correspondence in position between the radiation pattern of the projector and a projection pattern produced in the field of view by the radiation pattern.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams for explaining an example of the relation between a radiation pattern and a projection pattern in the image measurement system according to the present embodiment.

FIGS. 6A, 6B, 7A, and 7B are diagrams for explaining a calibration process in the image measurement system according to the present embodiment.

FIG. 8 is a flowchart showing the more detailed procedure of step S1 in FIG. 5.

FIG. 12 is a flowchart showing the more detailed procedure of step S3 in FIG. 5.

FIG. 22 is a diagram showing an example of the user interface directed to the process of automatic setting of a mask area in the image measurement system according to the present embodiment.

FIGS. 23A to 23C and 24A to 24C are diagrams for explaining the process of setting a mask area corresponding to a test area in the image measurement system according to the present embodiment.

FIGS. 28A to 28D are diagrams for explaining an operation example for changing the set mask area in the image measurement system according to the present embodiment.

DESCRIPTION OF THE PREFERRED EMBODIMENTS

Embodiments of the present invention will be described in details with reference to the figures. It is noted that the same or corresponding parts in the figures are denoted with the same reference signs and a description thereof will not be repeated.

<A. Basic Configuration>

First of all, referring to FIG. 1, a basic configuration of the image measurement system according to the present embodiment will be described.

Figure 1:
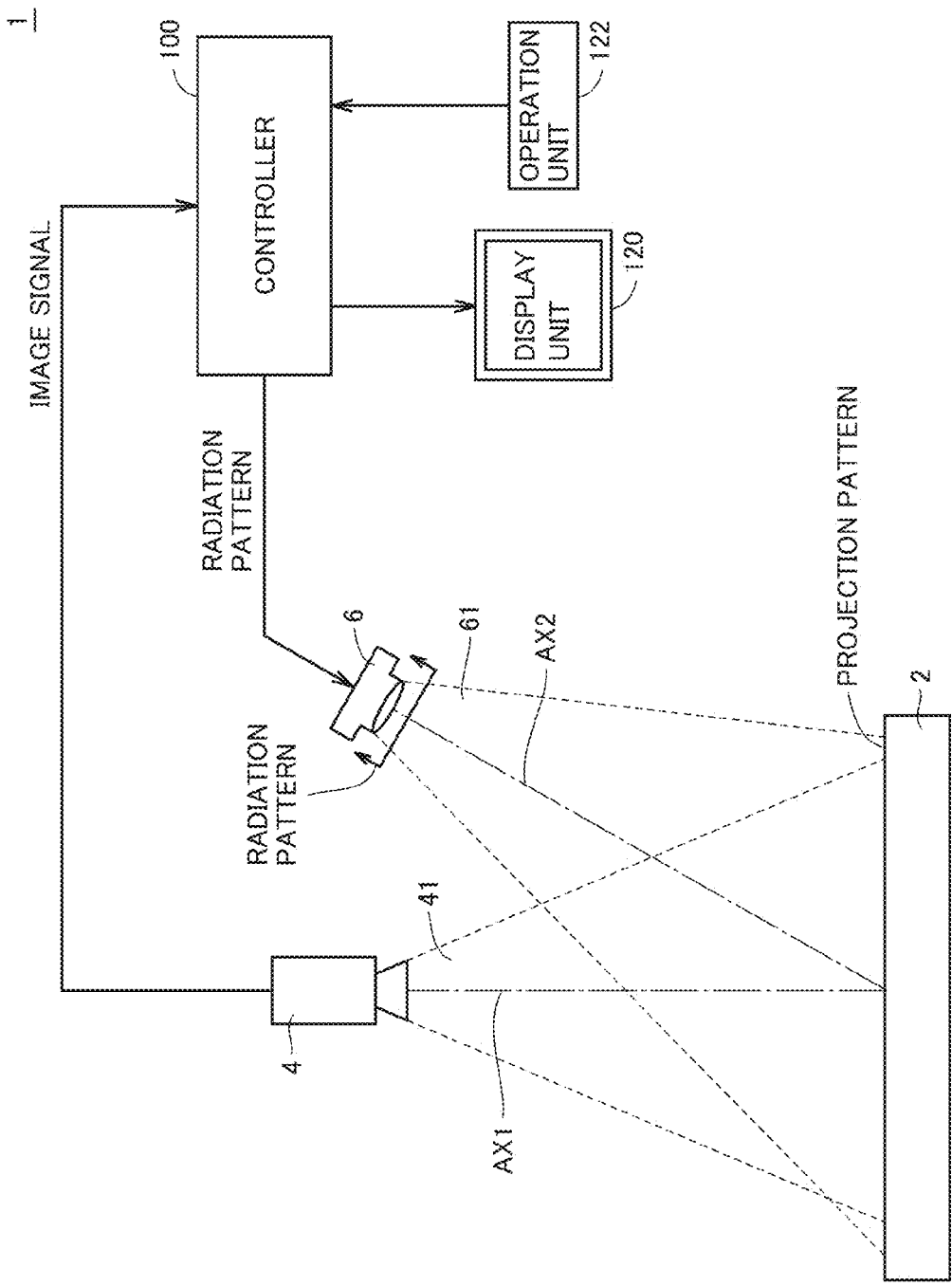
FIG. 1 is a diagram showing a basic configuration of an image measurement system according to the present embodiment.

Referring to FIG. 1, an image measurement system 1 includes a controller 100, and an imaging unit 4 and a projector 6 connected to controller 100. Controller 100 centrally controls image measurement system 1.

Imaging unit 4 captures an image of any given object arranged on a sample stage 2 and outputs an image signal (which may include one or more still images and moving images) obtained by image capturing to controller 100. Imaging unit 4 is a photoelectric converter converting light included in a predetermined field of view 41 into an image signal and is typically configured with, for example, a CCD (Charge-Coupled Device) image sensor or a CMOS (Complementary Metal-Oxide-Semiconductor) image sensor.

Projector 6 emits illumination light 61 to any given object arranged on sample stage 2. Illumination light 61 emitted from projector 6 can be changed as desired in accordance with a radiation pattern specified from controller 100. Projector 6 basically includes a source of light of emission wavelengths in a relatively wide range, such as a white LED (Light Emitting Diode) and a xenon lamp, and a pattern formation unit disposed on the front surface of the light source to form a desired radiation pattern. The pattern formation unit is typically configured with a transmittance layer or a reflective layer that can partially change transmittance or reflectance, or a device disposed for each pixel to change reflectance as desired. Projector 6 has any configuration and may have a known configuration.

As shown in FIG. 1, projector 6 emits illumination light 61 in accordance with a radiation pattern specified from controller 100, and imaging unit 4 haves a field of view 41 in which an area irradiated with illumination light 61 exists. In the configuration example shown in FIG. 1, the imaging direction of imaging unit 4 is an optical axis AX1, and the radiation direction of illumination light 61 of projector 6 is an optical axis AX2 different from optical axis AX1. Thus, the pattern of illumination light 61 emitted by projector 6, that is, the density pattern in cross section of optical axis AX2 of illumination light 61 exiting from the exit window of projector 6, does not always match the density pattern in the image obtained by imaging unit 4 capturing an image of illumination light 61 reaching and radiating sample stage 2 or an object. In the following, for convenience of explanation, the density pattern in cross-section of optical axis AX2 of illumination light 61 exiting from the exit window of projector 6 may be referred to as "radiation pattern", and the density pattern produced by illumination light 61 projected onto sample stage 2 or an object may be referred to as "projection pattern".

Image measurement system 1 further includes a display unit 120 and an operation unit 122 connected to controller 100. Display unit 120 is configured with, for example, a liquid crystal panel to display an image. Operation unit 122 receives an operation from users. Operation unit 122 is typically configured with, for example, a touch panel, a keyboard, and a mouse. Display unit 120 and operation unit 122 may be integrally configured as a display setting device.

The details of user interfaces through display unit 120 and operation unit 122 will be described later.

Figure 2:
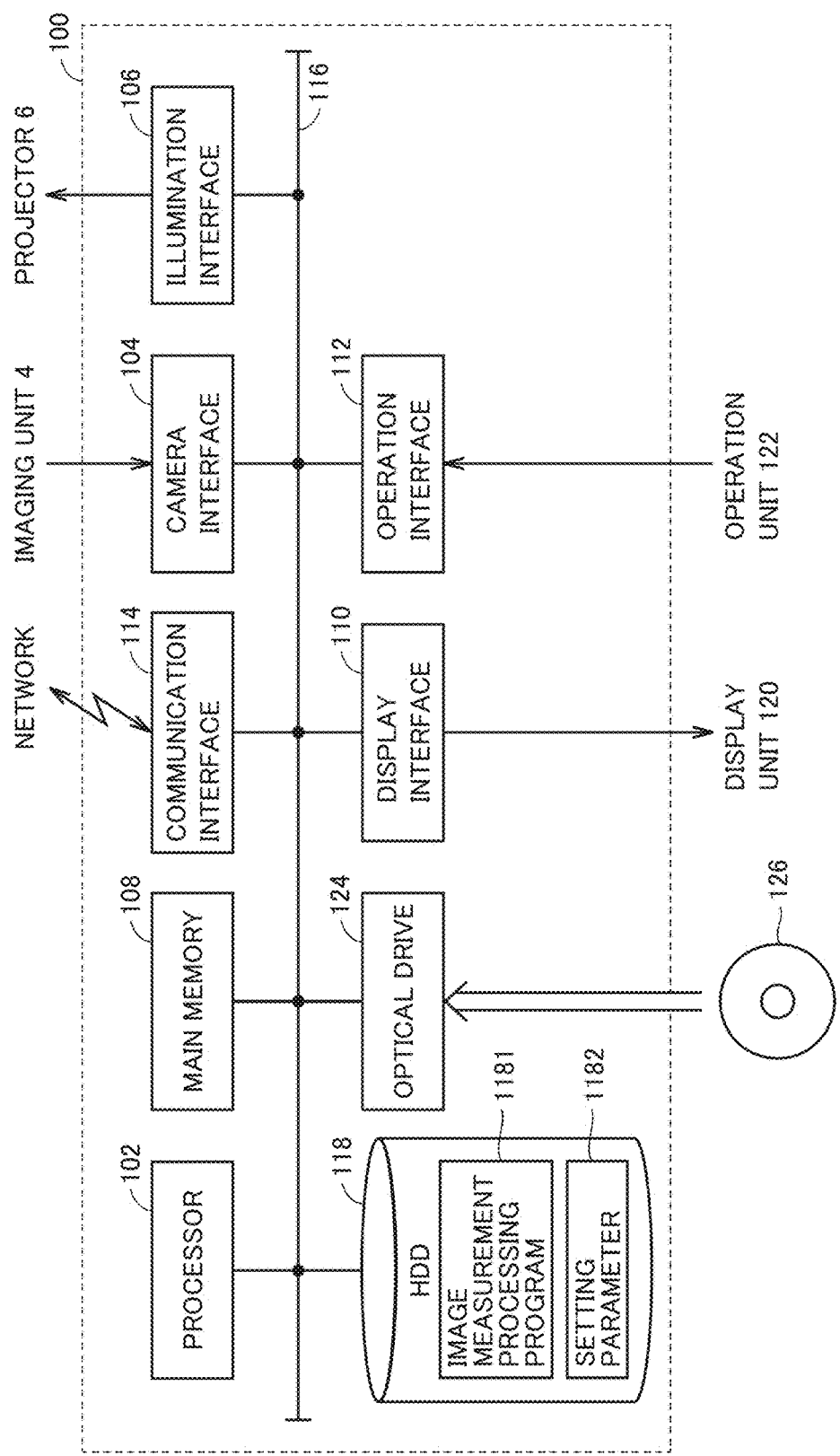
FIG. 2 is a diagram showing a hardware configuration example of the controller shown in FIG. 1.

Controller 100 typically can be configured on a basis of a general-purpose computer. Referring to FIG. 2, controller 100 includes, as main components, a processor 102, a hard disk drive (HDD) 118, a main memory 108, a camera interface 104, an illumination interface 106, a display interface 110, an operation interface 112, a communication interface 114, and an optical drive 124. These components are connected to each other for data communication through an internal bus 116.

Processor 102 is an operation processing unit such as a CPU (Central Processing Unit) and an MPU (Micro Processing Unit) and implements a variety of processing described later by loading a program read from hard disk drive 118 into main memory 108 for execution. Main memory 108 is typically configured with a nonvolatile memory such as a DRAM (Dynamic Random Access Memory).

Hard disk drive 118 typically stores an image measurement processing program 1181 and a setting parameter 1182. Processes implemented by executing image measurement processing program 1181 and a method of determining setting parameter 1182 will be described later.

Camera interface 104 is connected to imaging unit 4 to take in an image signal obtained by image capturing by imaging unit 4 and sends a command as to imaging timing and the like to imaging unit 4.

Illumination interface 106 is connected to projector 6 to give a command as to an illumination pattern to projector 6 and take in a status value and the like from projector 6.

Display interface 110 is connected to display unit 120 to send an image signal for displaying an image to display unit 120 in accordance with a command from processor 102 and the like.

Operation interface 112 is connected to operation unit 122 to take in a signal indicating a user operation from operation unit 122.

Communication interface 114 is connected to a not-shown network to intervene in exchanging of data with a server on a network.

Optical drive 124 reads a program from an optical disk 126 such as a DVD-ROM (Digital Versatile Disc-Read Only Memory) to install the read program into hard disk drive 118 or the like. The storage medium storing a program for implementing image measurement system 1 according to the present embodiment is not limited to optical disk 126 and may be any storage medium. When a storage medium other than optical disk 126 is employed, a reader suited for the employed storage medium may be installed.

Although FIG. 2 shows a configuration example in which necessary programs are installed into controller 100 through a storage medium such as optical disk 126, embodiments are not limited to this configuration. Necessary programs may be downloaded from a server on a network.

As shown in FIG. 2, when a general-purpose computer is used to implement controller 100, an OS (Operating System) for providing basic functions of computers may be installed in addition to a program for providing the functions according to the present embodiment. In this case, the program according to the present embodiment may invoke a necessary program module included in the program modules provided as part of the OS in a predetermined order and/or timing to execute processing. That is, the program according to the present embodiment may not include the program module as described above and may be implemented so as to cooperate with the OS to execute processing. That is, the program according to the present embodiment may be configured so as not to include part of the program modules.

The program according to the present embodiment may be built in part of another program. Also in this case, the program per se may not include the program modules included in another program as described above to be combined and may cooperate with the other program to execute processing.

In place of the configuration in which controller 100 is implemented using a general-purpose computer as shown in FIG. 2, the whole or some of the functions may be implemented using a dedicated circuit (for example, ASIC (Application Specific Integrated Circuit)). In addition, an external device may be responsible for part of the processing.

As described above, controller 100 may be implemented in a form adapted to the times when the invention according to the present embodiment is embodied.

<B. Overview of Problem and Solution>

An overview of the problem to be solved by image measurement system 1 according to the present embodiment and means for solving the problem will now be described.

In image measurement system 1 as shown in FIG. 1, it is preferable that a wider variety of objects can be imaged to be subjected to image measurement processing. Meanwhile, depending on the materials and structures of objects, regular reflection may locally occur to cause partial whiteout (that is, halation) in the captured image. Then, in image measurement system 1, projector 6 is used to emit illumination light suitable for an object to suppress halation.

That is, image measurement system 1 according to the present embodiment provides the user-assist function of manually, semi-automatically, and automatically determining a projection pattern for suppressing halation for an object that otherwise causes local halation. More specifically, the present embodiment facilitates the operation of setting a mask area in a projection pattern of illumination light emitted from projector 6.

In the present description, "mask area" means an area or a region in which the quantity of illumination light should be reduced compared with the other area, in the density pattern of the emitted illumination light. "The quantity of illumination light is reduced compared with the other area" includes reducing the quantity of illumination light to a certain value not zero compared with the other area and additionally may include reducing the quantity of illumination light to zero. In the following description, the quantity of illumination light may be simply referred to as "the illumination light quantity".

The "mask area" set for illumination light may not necessarily be a single area but may include a plurality of areas separate from each other. In this case, the quantities of light corresponding to the areas may be the same or may be different. The position, range, quantity of light, and the like of the "mask area" may be set as desired as long as halation does not occur when imaging unit 4 captures an object.

Figure 3A:
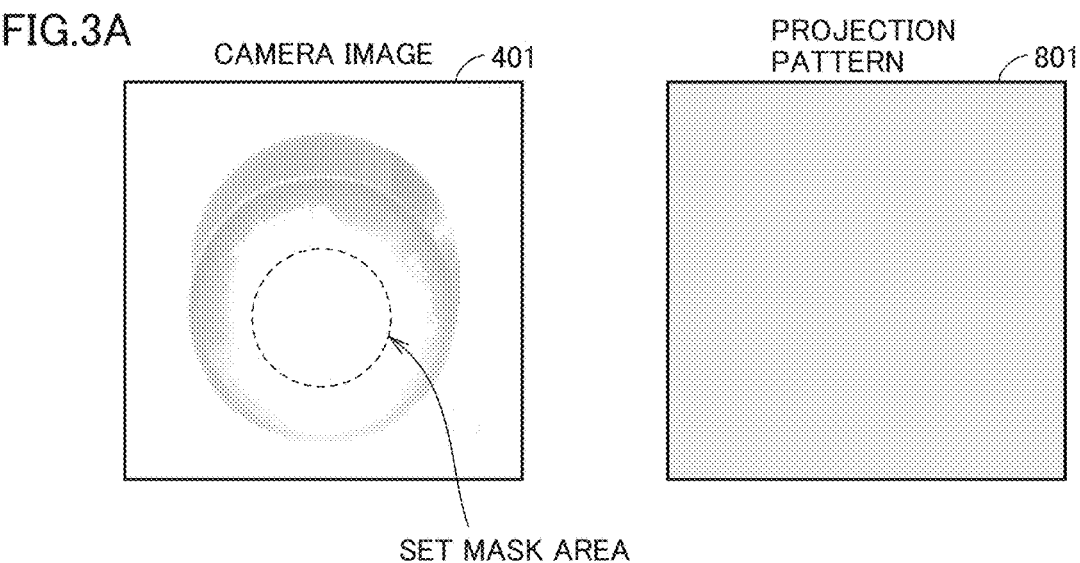
FIGS. 3A and 3B are diagrams for explaining an example of the method of setting a mask area in the image measurement system according to the present embodiment.
Figure 3B:
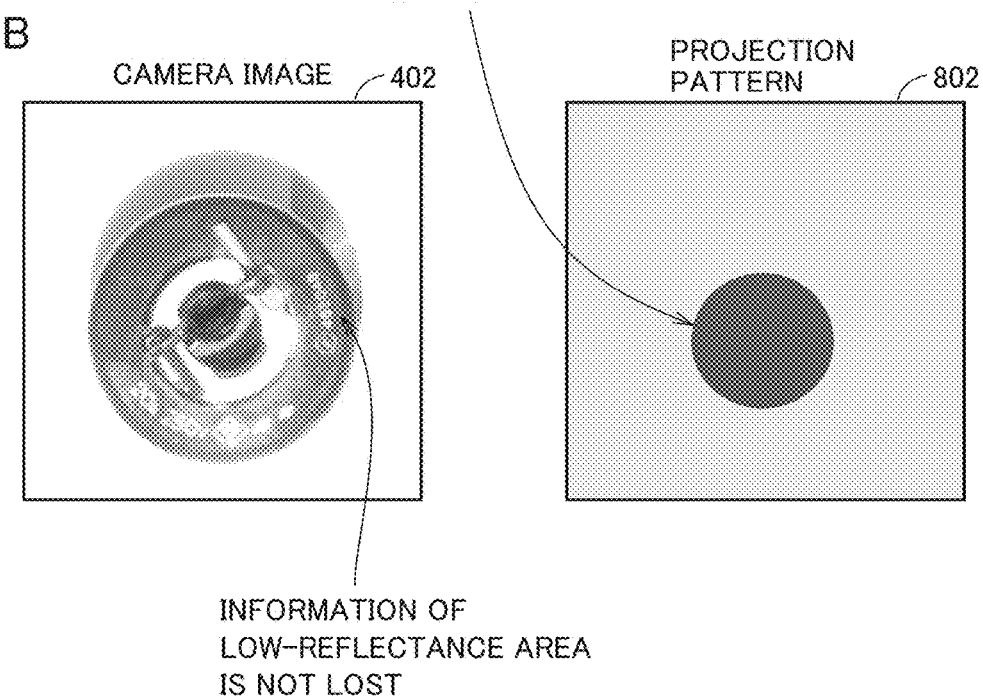

Referring to FIGS. 3A and 3B, an example of the method of setting a mask area in image measurement system 1 according to the present embodiment will be described. FIG. 3A shows a camera image 401, which is an image obtained by imaging unit 4 capturing an image of an object in a state in which the object is irradiated with illumination light having a projection pattern 801 in which the quantity of light is constant (uniform) on a plane. In camera image 401, halation occurs around the center of the object to prevent acquisition of image information around the center.

Then, as shown in FIG. 3A, a mask area is set to be associated in position with camera image 401. In accordance with the setting of this mask area, illumination light having a projection pattern 802 as shown in FIG. 3B is emitted to the object. It can be understood that emitting illumination light having projection pattern 802 to the object enables acquisition of image information also around the center of the object where halation occurs, as shown in camera image 402. Furthermore, it can be understood that, in a camera image 402 shown in FIG. 3B, image information can be acquired also for an area having a relatively low reflectance (low-reflectance area) in addition to image information of an area having a relatively high reflectance (high-reflectance area) where halation occurs.

In this way, it can be understood that, in image measurement system 1 according to the present embodiment, the projection pattern of illumination light emitted by projector 6 to an object is adjusted so that image information can be acquired appropriately even for an object with a surface reflectance locally changing. In other words, the dynamic range of imaging can be substantially improved by adjusting the projection pattern of illumination light.

As described above, when the imaging direction of imaging unit 4 does not match the radiation direction of illumination light 61 of projector 6, the radiation pattern does not match the projection pattern, either. Then, in order to obtain a projection pattern including the specified mask area, it is necessary to update the corresponding radiation pattern.

Referring to FIGS. 4A and 4B, an example of the relation between a radiation pattern and a projection pattern in image measurement system 1 according to the present embodiment will be described. For example, when the configuration as shown in FIG. 1 is employed, as shown in FIG. 4A, it is necessary to set a trapezoidal radiation pattern 601 in order to obtain a rectangular projection pattern 801. Here, as shown in FIG. 4B, when a circular mask area is set in projection pattern 801, an oval mask area is set in the corresponding radiation pattern 602 in accordance with the mapping relation between projection pattern 801 and radiation pattern 601. In this way, image measurement system 1 updates the radiation pattern in accordance with the set mask area, based on the correspondence in position between the radiation pattern of projector 6 and the projection pattern produced in the field of view of imaging unit 4 by the radiation pattern.

Figure 5:
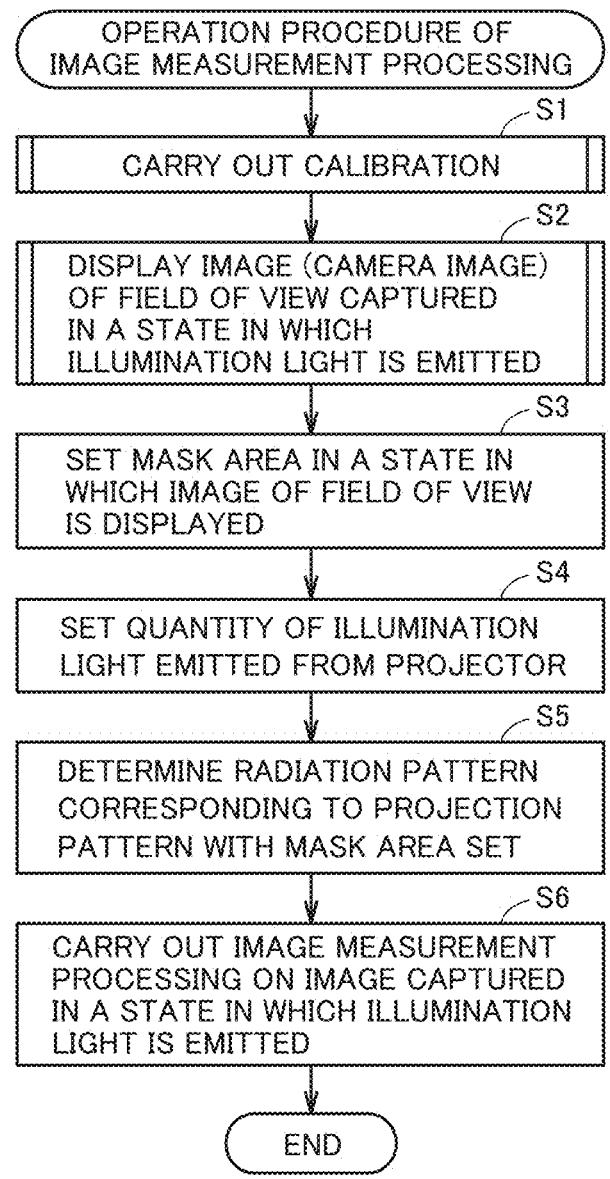
FIG. 5 is a flowchart showing an example of the operation procedure of image measurement processing using the image measurement system according to the present embodiment.

The operation procedure in image measurement system 1 according to the present embodiment will be summarized as follows. FIG. 5 is a flowchart showing an example of the operation procedure of the image measurement processing using image measurement system 1 according to the present embodiment. Referring to FIG. 5, first, calibration is carried out (step S1). This calibration includes the process of determining the correspondence in position between the radiation pattern of projector 6 and the projection pattern produced in the field of view of imaging unit 4 by the radiation pattern.

Subsequently, the image of the field of view captured by imaging unit 4 in a state in which illumination light is emitted appears on display unit 120 (step S2). That is, in step S2, controller 100 displays an image captured by imaging unit 4 on display unit 120.

A mask area is set in a state in which the image of the field of view appears on display unit 120 (step S3). In step S3, controller 100 receives the setting of a mask area, which is an area where the quantity of illumination light should be reduced compared with the other area in the field of view, in association with the image appearing on display unit 120. In addition, the magnitude of the quantity of illumination light emitted from projector 6 is set as necessary (step S4). That is, in step S3, controller 100 receives the setting as to the magnitude of the quantity of illumination light emitted from projector 6.

When the setting of the mask area and the setting of the quantity of illumination light are completed, a radiation pattern corresponding to the projection pattern with the mask area set is determined (step S5). That is, in step S5, controller 100 updates the radiation pattern in accordance with the set mask area, based on the correspondence in position between the radiation pattern of projector 6 and the projection pattern produced in the field of view of imaging unit 4 by the radiation pattern.

Then, illumination light is emitted from projector 6 in accordance with the updated radiation pattern, and image measurement processing is carried out for the image captured by imaging unit 4 in a state in which the illumination light is emitted (step S6). The image measurement processing in step S6 may be repeatedly performed a required number of times.

<C. Calibration>

The more detailed process procedure of the calibration (step S1) shown in FIG. 5 will now be described. In this calibration, a conversion parameter (typically, coefficient matrix) is calculated, which enables conversion between the radiation pattern of projector 6 and the projection pattern produced in the field of view of imaging unit 4 by the radiation pattern.

In the calibration, one or more predetermined reference radiation patterns are emitted. A conversion parameter is determined from the correspondence between the projection pattern appearing in the camera image obtained by imaging unit 4 capturing an image of radiation of each of the reference radiation patterns and the corresponding reference radiation pattern.

Referring to FIGS. 6A and 6B, the calibration process in image measurement system 1 according to the present embodiment will be described. For example, as shown in FIG. 6A, it is assumed that a rectangular reference radiation pattern 1 is set, and a projection pattern 1 corresponding to reference radiation pattern 1 is captured.

The vertexes of radiation pattern 1 are defined as a(x1, y1), b(x2, y2), c(x3, y3), d(x4, y4), and the vertexes of the corresponding projection pattern 1 in the image captured by imaging unit 4 are extracted as A(X1, Y1), B(X2, Y2), C(X3, Y3), D(X4, Y4). The coordinates of the vertexes a, b, c, d are defined in the coordinate system defining the radiation pattern, and the coordinates of the vertexes A, B, C, D are defined in the coordinate system defining the field of view of imaging unit 4. The conversion parameter between these vertexes is determined such that the following relation is established. It is also possible to calculate a conversion parameter for performing reverse conversion from the determined conversion parameter.

Conversion matrix $X \times a(x1,y1) \rightarrow A(X1,Y1)$

Conversion matrix $X \times b(x2,y2) \rightarrow A(X2,Y2)$

Conversion matrix $X \times c(x3,y3) \rightarrow A(X3,Y3)$

Conversion matrix $X \times d(x4,y4) \rightarrow A(X4,Y4)$

In place of radiation pattern 1 as shown in FIG. 6A, another radiation pattern may be employed. For example, as shown in FIG. 6B, a radiation pattern 2 including discrete components may be employed. In this case, it is assumed that the respective center points of the areas are defined as e(x5, y5), f(x6, y6), g(x7, y7), h(x8, y8). Here, it is assumed that a projection pattern 2 as shown in FIG. 6B is captured. The respective center points of the corresponding areas in projection pattern 2 are extracted as E(X5, Y5), F(X6, Y6), G(X7, Y7), H(X8, Y8). Also in this case, a conversion parameter is calculated in accordance with the same procedure as described above.

In terms of improving the accuracy of calculation of the conversion parameter, it is preferable to emit a plurality of reference radiation patterns, calculate the respective conversion parameters from the projection parameters resulting from the radiations, and then perform statistical processing.

Figure 7A:
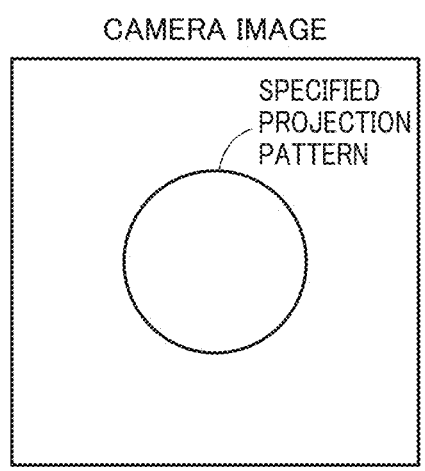
Figure 7B:
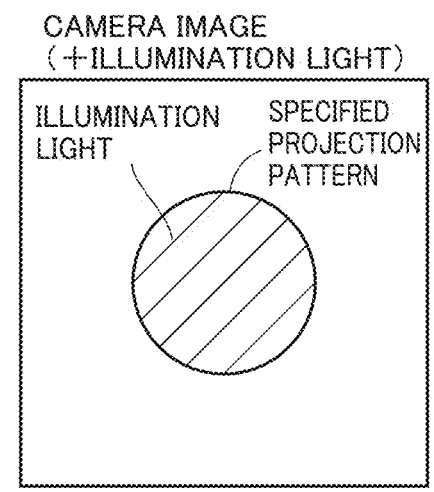

It is preferable that whether illumination light corresponding to the projection pattern set by the user is ultimately emitted can be confirmed. Referring to FIGS. 7A and 7B, the procedure of confirming the calibration in image measurement system 1 according to the present embodiment will be described. As shown in FIG. 7A, the user specifies a projection pattern in association with an image (camera image) captured by imaging unit 4. In accordance with the projection pattern specified, the radiation pattern is updated based on the conversion parameter determined by calibration. FIG. 7B shows display of a camera image obtained by imaging unit 4 capturing an image of illumination light emitted from projector 6 in accordance with the updated radiation pattern.

Since the projection pattern should be displayed so as to be associated with the actual camera image on display unit 120, the projection pattern converted in accordance with the conversion parameter may be reduced or enlarged with respect to the barycenter of the image. In this case, the user may specify the degree of reduction or enlargement.

The user confirms that the projection pattern specified by the user matches the emitted illumination light in the camera image, and if they generally match, determines to complete the calibration.

In this way, controller 100 of image measurement system 1 according to the present embodiment allows projector 6 to emit illumination light in accordance with a predetermined reference radiation pattern and determines the correspondence in position (conversion parameter) based on the projection pattern appearing in the image captured by imaging unit 4.

The details of the calibration procedure described above are as follows. FIG. 8 is a flowchart showing the more detailed procedure of step S1 in FIG. 5. Referring to FIG. 8, controller 100 instructs projector 6 to emit one or more predetermined reference radiation patterns (step S11). Controller 100 acquires the image captured by imaging unit 4 (step S12) and extracts the coordinates of feature points of the projection pattern included in the acquired image (step S13). Controller 100 calculates a conversion parameter, based on the coordinates of the extracted feature points of the projection pattern (the coordinates of the vertexes in the projection pattern shown in FIGS. 6A and 6B) and the coordinates of the vertexes of the corresponding radiation pattern (step S14).

The user specifies a desired projection pattern in association with the image captured by imaging unit 4 (see FIG. 7A). That is, controller 100 receives the setting of a projection pattern specified by the user (step S15) and determines a corresponding projection pattern from the specified projection pattern, based on the conversion parameter calculated in step S14 (step S16).

Controller 100 instructs projector 6 to emit the projection pattern determined in step S16 and displays the image captured by imaging unit 4 in a state in which the illumination light is emitted, on display unit 120 (step S17). Looking at the image appearing on display unit 120, the user then inputs whether the specified projection pattern matches the outline of the actually emitted illumination light. That is, controller 100 receives the specification as to whether the actually emitted illumination light matches the specified projection pattern (step S18). If the actually emitted illumination light does not match the specified projection pattern (if NO in step S18), the process subsequent to step S11 is repeated.

By contrast, if the actually emitted illumination light matches the specified projection pattern (if YES in step S18), the calibration process ends.

<D. User Interface Example for Setting Mask Region (Manual Operation)>

An example of the user interface in connection with the display of the image captured in a state in which illumination light is emitted (step S2) and the setting of a mask area (step S3) as shown in FIG. 5 will now be described. The user interface example illustrated below is mainly to set a mask area through user manual operation.

Figure 9:
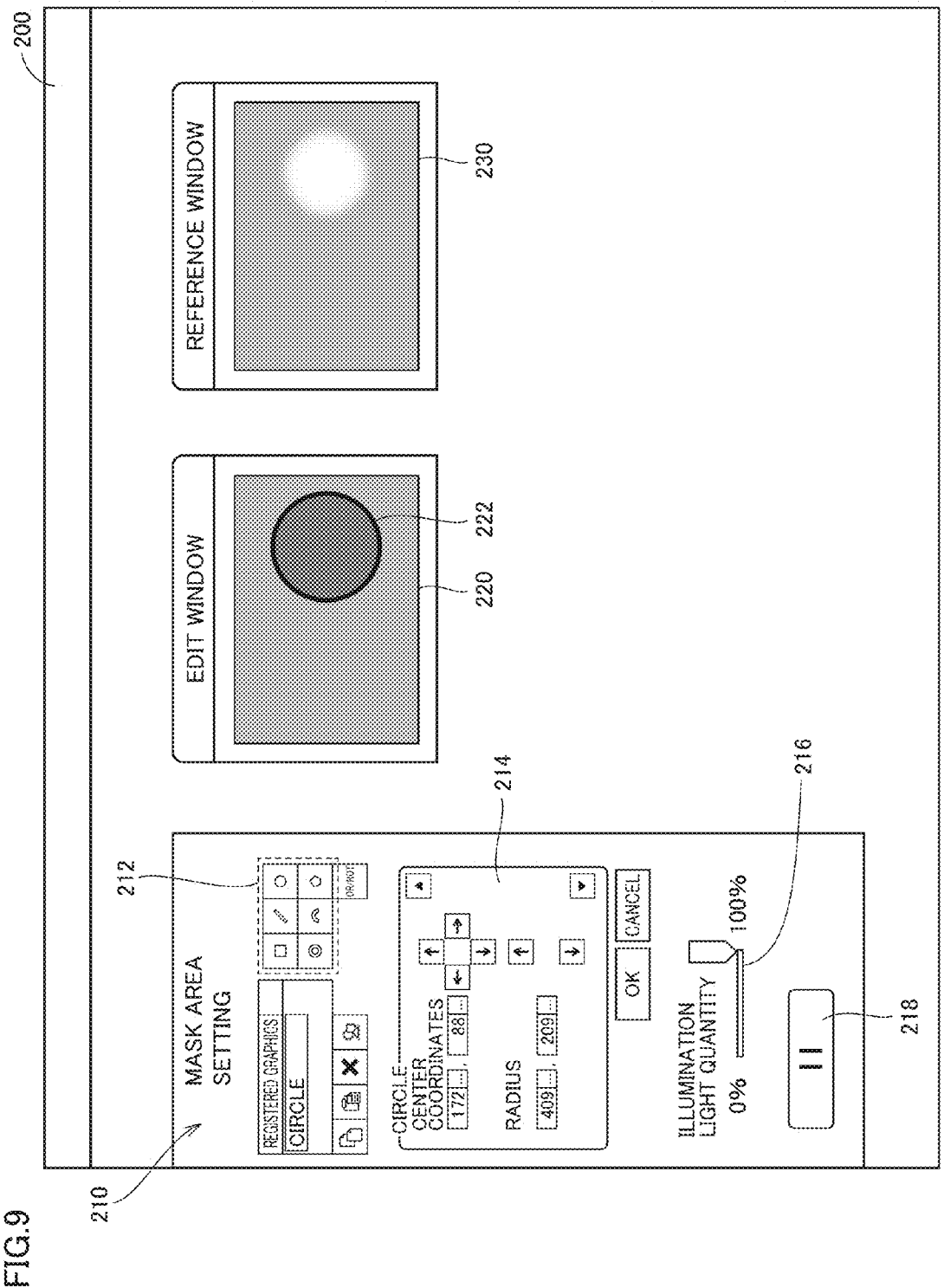
FIGS. 9 to 11 are diagrams showing an example of the user interface for setting a mask area in the image measurement system according to the present embodiment.
Figure 10:
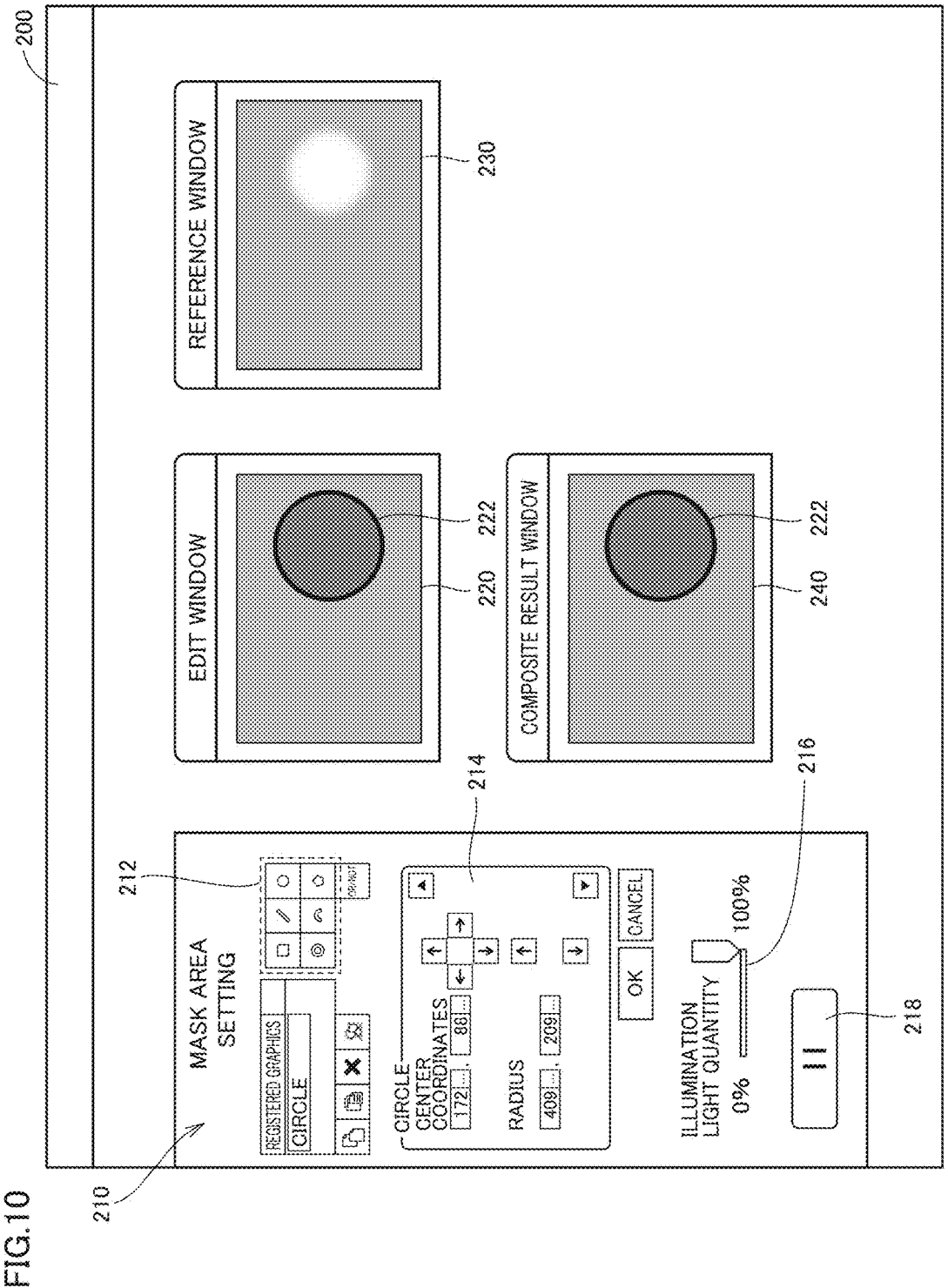
Figure 11:
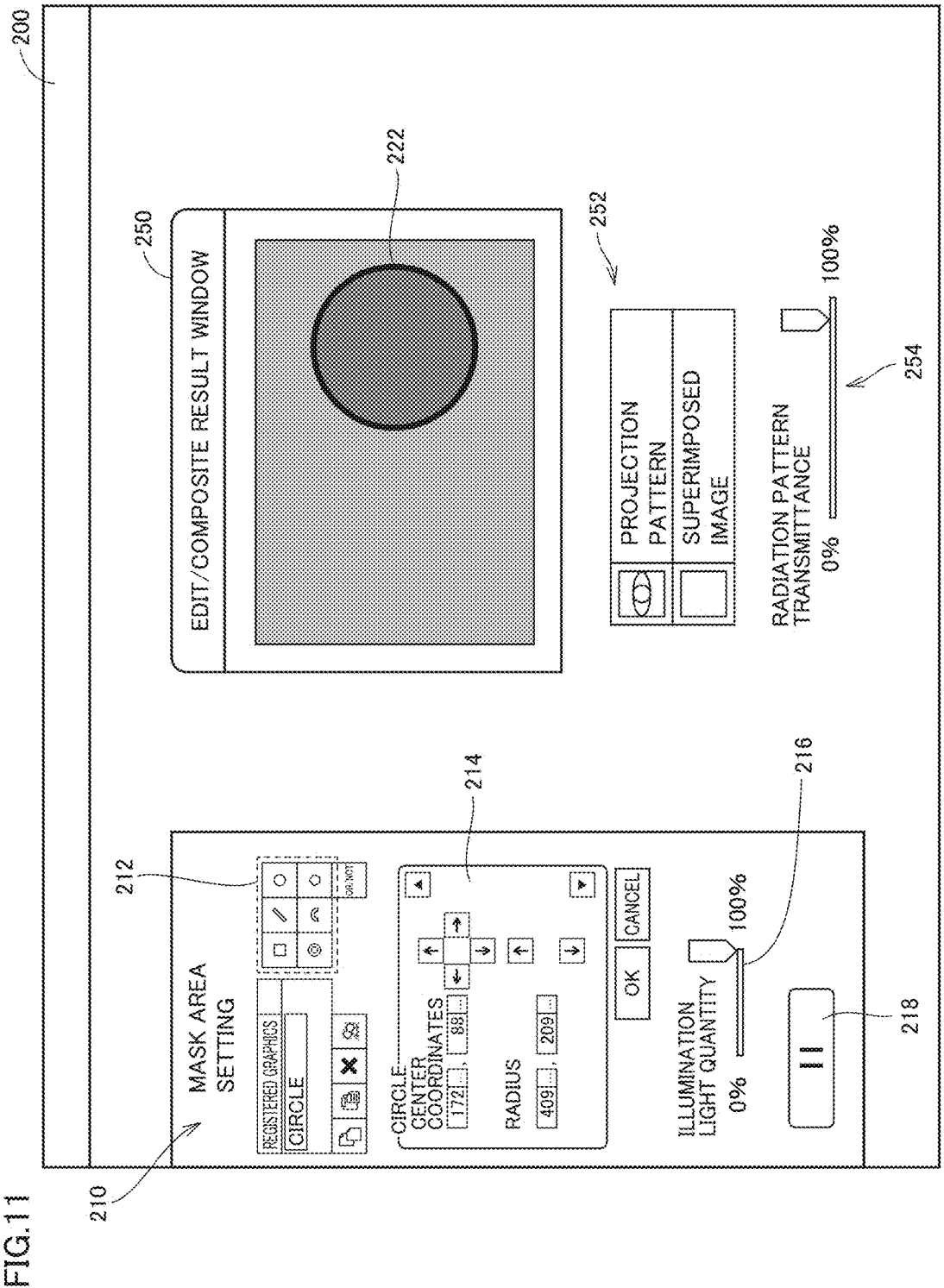

Referring to FIGS. 9 to 11, an example of the user interface for setting a mask area in image measurement system 1 according to the present embodiment will be described.

(d1: First User Interface Screen)

A user interface screen 200 shown in FIG. 9 appears on display unit 120 and receives a user operation in any given method. More specifically, user interface screen 200 includes an edit window 220 for setting a projection pattern desired by the user and a reference window 230 for displaying an image (camera image) captured by imaging unit 4. In edit window 220 shown in FIG. 9, a mask area 222 is set. The projection pattern displayed in edit window 220 and the camera image displayed in reference window 230 are associated in position with each other. That is, controller 100 displays a screen (edit window 220) showing the set mask area 222 in association with a screen (reference window 230) for the camera image, in addition to the image of the field of view (camera image) displayed in reference window 230.

In this state, when the user sets a desired projection pattern (that is, mask area) in edit window 220, controller 100 determines or updates a radiation pattern so as to produce the specified projection pattern (illumination light) at a position corresponding to the setting.

User interface screen 200 further includes a mask area setting field 210. Mask area setting field 210 can receive a variety of operations for setting mask area 222.

In connection with the setting of a mask area in mask area setting field 210, controller 100 receives the selection of a plurality of predefined shapes and the specification of the size and position of an area having the selected shape. More specifically, mask area setting field 210 includes a mask area shape selection buttons 212 and a shape size selection field 214. The user selects a desired button included in mask area shape selection buttons 212 to select a desired shape (for example, circle, rectangle, or sector) as mask area 222. The user then may operate a button and/or input box included in shape size selection field 214 to set a desired shape and position for mask area 222.

Mask area setting field 210 further includes an illumination light quantity slider 216. The user may operate illumination light quantity slider 216 to adjust the quantity of illumination light. For example, the user can adjust the maximum value (or reference value) of the quantity of light in the radiation pattern of illumination light emitted from projector 6, by operating illumination light quantity slider 216 without selecting any mask area. That is, controller 100 receives the setting of the magnitude of the quantity of illumination light emitted from projector 6.

To set the quantity of illumination light in the mask area to zero, illumination light quantity slider 216 is operated after the target mask area is selected. The method of adjusting the quantity of illumination light for a mask area will be described later.

Mask area setting field 210 includes a Through/Freeze image switch button 218. Every time the user selects Through/Freeze image switch button 218, the camera image displayed in reference window 230 is alternately switched between Through display (real-time display) and Freeze display (static display). For example, the user selects Through/Freeze image switch button 218 at any timing to display the camera image at that timing in a fixed manner in reference window 230 and sets a mask area in this state. Then, after the setting of a mask area is completed, the user selects Through/Freeze image switch button 218 again to display the camera image in Through display to confirm whether the set mask area is appropriate.

As shown in FIG. 9, user interface screen 200 including edit window 220 and reference window 230 allows the user to confirm how illumination light corresponding to the set mask area is emitted and to set a mask area more quickly. Although FIG. 9 shows an example in which edit window 220 and reference window 230 are arranged side by side horizontally, those windows may be arranged vertically, or the direction in which those windows are arranged may be determined in accordance with the screen size of display unit 120.

(d2: Second User Interface Screen)

A user interface screen 202 shown in FIG. 10 differs from user interface screen 200 shown in FIG. 9 in that a composite result window 240 is further displayed. In composite result window 240, mask area 222 set in edit window 220 is superimposed on the camera image displayed in reference window 230. That is, controller 100 displays an image of the set mask area 222 combined with the camera image in composite result window 240, in addition to the image of the field of view (camera image) displayed in reference window 230.

The display of such composite result window 240 allows the user to grasp the association in position between the camera image and the projection pattern more easily. That is, as shown in FIG. 10, composite result window 240 is displayed to allow the user to promptly confirm how the set mask area is incorporated in the camera image and to set a mask area more quickly. The arrangement direction, the arrangement order, and the like of edit window 220, reference window 230, and composite result window 240 may be changed as desired by the user.

(d3: Third User Interface Screen)

A user interface screen 204 shown in FIG. 11 includes an edit/composite result window 250. In edit/composite result window 250, edit window 220 and composite result window 240 included in user interface screen 202 shown in FIG. 10 are displayed selectively. More specifically, the content displayed in edit/composite result window 250 is changed in order in accordance with the user operation on selection form 252.

That is, controller 100 selectively displays the image (camera image) of the field of view captured by imaging unit 4 and the image obtained by combining the set mask area 222 with the camera image in edit/composite result window 250.

In user interface screen 204, the state of mask area 222 and the state of the set mask area 222 superimposed on the camera image can be selectively displayed. The user can switch the selection in selection form 252 as appropriate to easily confirm whether the desired mask area 222 is set.

User interface screen 204 further includes a transmittance slider 254. The user can operate transmittance slider 254 to adjust the amount of transmittance of mask area 222 superimposed on the camera image and thereby can easily confirm the correspondence between the area of halation included in the camera image and mask area 222.

By arranging the common edit/composite result window 250 shown in FIG. 11 and switching the content displayed in edit/composite result window 250 as appropriate, it is possible to easily set mask area 222 while reducing the necessary area for display into a compact size.

Although FIG. 11 shows an example in which edit window 220 and composite result window 240 are switchable, reference window 230 shown in FIGS. 9 and 10 may additionally be switched. Alternatively, another additional information may be selectively displayed.

(d4: Process Procedure)

The details of the procedure for setting a mask area as described above are as follows. FIG. 12 is a flowchart showing the more detailed procedure of step S3 in FIG. 5. Referring to FIG. 12, the user views a camera image captured by imaging unit 4 in step S2 in FIG. 5 in the Through display state and switches the image to Freeze display at an appropriate timing (step S31). The user then operates operation unit 122 (mask area setting field 210 in FIGS. 9 to 11) to arrange a mask area with a desired shape (step S32) and adjust the position and size thereof as appropriate depending on the area where halation occurs in the camera image (step S33). After completion of adjustment of the position and size of the mask area, the user switches the camera image to Through display (step S34) to confirm whether halation in the camera image is suppressed (step S35). If halation in the camera image is not suppressed (if NO in step S35), the process subsequent to step S31 is performed again.

By contrast, if halation in the camera image is suppressed (if YES in step S35), the process of setting a mask area is completed.

(d5: Blur)

In the foregoing operation example, a typical example has been described in which a mask area is set to be associated with the area where halation occurs in the camera image. Blur of light may occur due to the material of the object or the difference in reflectance between the materials of the object.

Figure 13A:
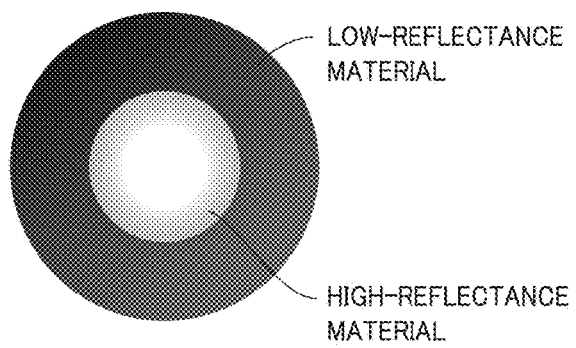
FIGS. 13A and 13B are diagrams for explaining blur of light.
Figure 13B:
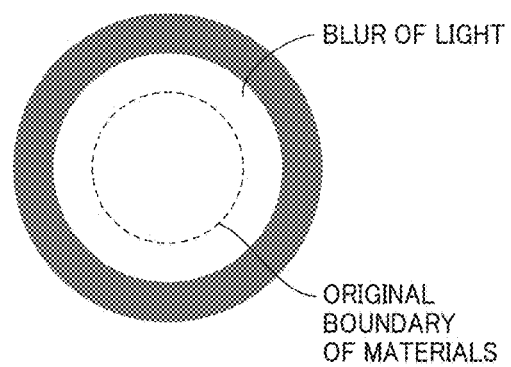

Referring to FIGS. 13A and 13B, blur of light will be described. An object composed of two kinds of materials is taken as an example. An object shown in FIG. 13A has a high-reflectance material (for example, resin) disposed on the inner diameter side and a low-reflectance material (for example, metal) disposed on the outer peripheral side. When such an object is irradiated with illumination light, reflection from the high-reflectance material on the inner diameter side is relatively large. Such a difference in reflectance may cause reflection light from the high-reflectance material to blur into the low-reflectance material, as shown in FIG. 13B. Such blur of light causes halation outward of the boundary between the materials.

Therefore, a mark area more suitable for the object is set using the aforementioned user interface, whereby image information can be acquired without any loss even when a high-reflectance material and a low-reflectance material are mixed in the same object.

That is, when a high-reflectance material and a low-reflectance material are present in the same field of view of imaging unit 4, blur of light reflected by the area of the high-reflectance material may obscure the area of the low-reflectance material and cause a loss of the image information of this area. In such a situation, it is necessary to reduce the quantity of illumination light corresponding to the area of the high-reflectance material. In general, since the position of an area of a high-reflectance material varies among the types of objects, it is difficult to set a uniform mask area. However, image measurement system 1 according to the present embodiment uses projector 6 as illumination and provides the user interface as described above, so that an appropriate mask area can be set freely depending on the object. Therefore, even in the case where different kinds of objects are present, it is possible to appropriately acquire image information of the area of a low-reflectance material while reducing the effects of halation produced in the high-reflectance material.

<E. User Interface Example for Setting Mask Region (Semi-automatic Operation)>

Another example of the user interface in connection with the display of the image captured in a state in which illumination light is emitted (step S2) and the setting of a mask area (step S3) shown in FIG. 5 will now be described. The user interface example illustrated below is mainly to set a mask area through semi-automatic operation. More specifically, in the configuration illustrated below, controller 100 extracts a mask area from the camera image, and the user makes a necessary change in the extracted mask area. That is, controller 100 has the function of extracting an area having a pixel value matching a predetermined condition in the camera image that is the image of the field of view, as a candidate for the mask area.

FIGS. 14A to 14D show an example of the user interface for setting a mask area through semi-automatic operation in image measurement system 1 according to the present embodiment. In a user interface screen 206 shown in FIGS. 14A to 14D, one or both of the projection pattern (mask area) set by the user and the camera image captured by imaging unit 4 are selectively displayed.

User interface screen 206 includes an illumination pattern display-enabling button 266 for enabling the display of a projection pattern and a camera image display-enabling button 268 for enabling the display of a camera image. The user selects these buttons as appropriate to switch the image appearing on user interface screen 206.

User interface screen 206 further includes a mask candidate area extracting function button 262 and a mask generating button 264. Mask candidate area extracting function button 262 enables the function of extracting a candidate for the mask area (which may be referred to as "mask candidate area") as described later. When a range to be set as a mask area from the extracted mask candidate area is fixed, mask generating button 264 enables the function of determining the fixed range as a mask area. Referring to FIGS. 14A to 14D, the procedure of setting a mask area will be described below.

Figure 14A:
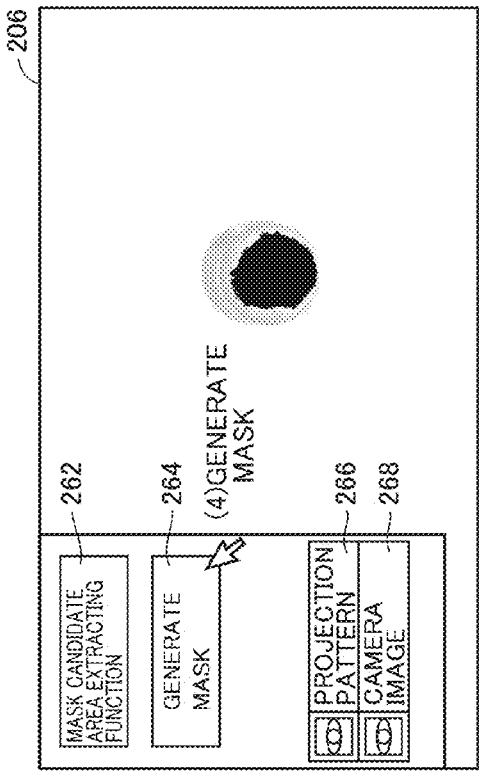
FIGS. 14A to 14D are diagrams showing an example of the user interface for setting a mask area through semi-automatic operation in the image measurement system according to the present embodiment.

First of all, as shown in FIG. 14A, the user selects mask candidate area extracting function button 262 to enable the function of selecting a mask candidate area ((1) in FIG. 14A). The user then selects an edge defining the boundary of the mask candidate area in the displayed camera image ((2) in FIG. 14A).

Figure 14B:
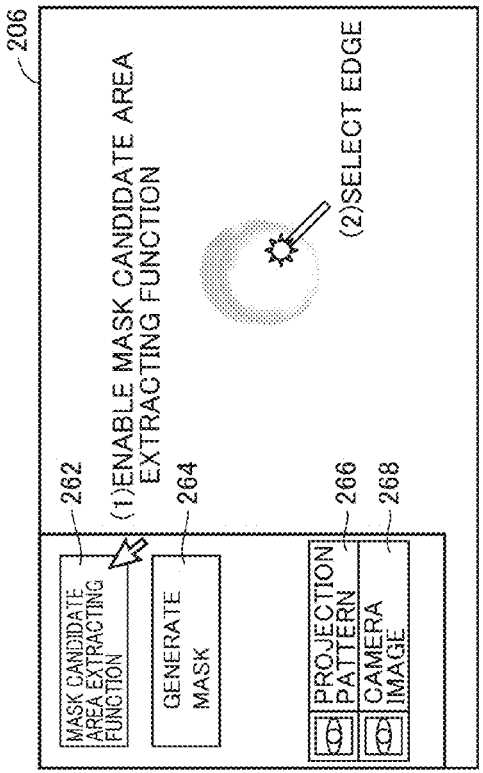

Then, as shown in FIG. 14B, an area having a relatively high luminance in the vicinity of the selected edge (typically, an area where halation occurs) is extracted as a mask candidate area ((3) in FIG. 14B). The shape, range, and the like of the extracted mask candidate area can be changed as desired through the user operation as described later.

Figure 14C:
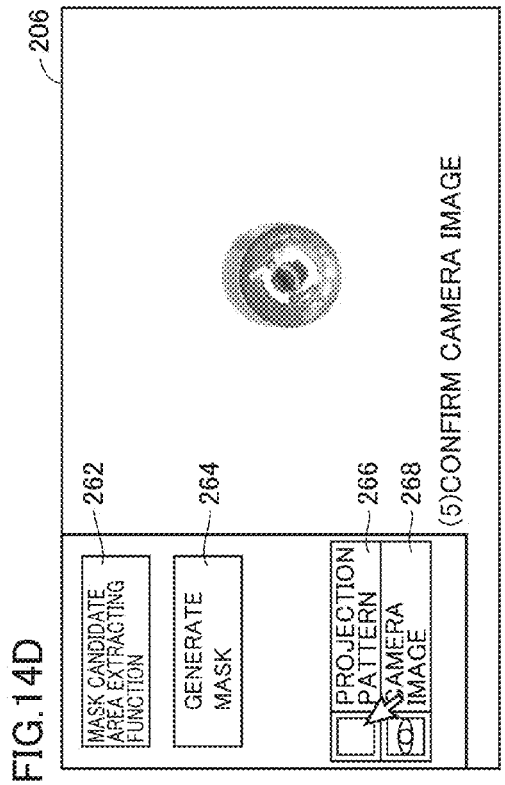

Then, as shown in FIG. 14C, the user selects mask generating button 264 to set the mask candidate area set at the time of selection, as a mask area ((4) in FIG. 14C). Controller 100 calculates a radiation pattern from the projection pattern including the set mask area, in accordance with the process procedure as described above.

Figure 14D:
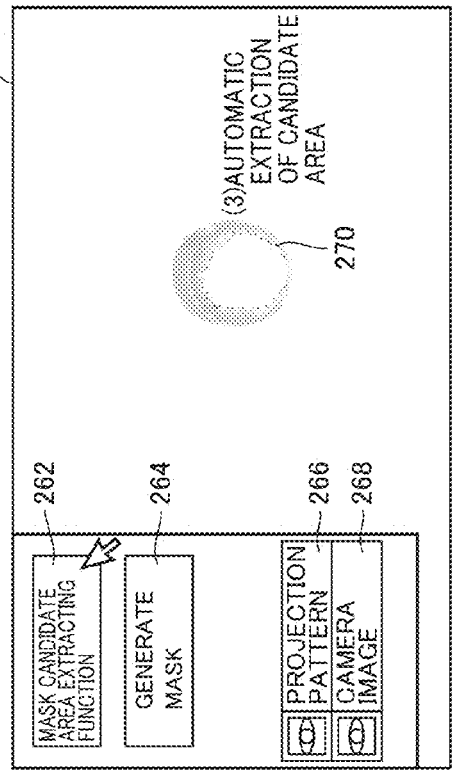

Finally, as shown in FIG. 14D, the user disables the display of the projection pattern and determines whether a mask area is set appropriately by viewing the camera image captured in a state in which illumination light is emitted to the object in accordance with the set mask area.

Although the magnitude of luminance is used as a predetermined condition for extracting a mask candidate area in the foregoing description, the luminance distribution in the image or another preliminary information may be used.

Through the procedure above, the user can set a mask area, that is, a projection pattern more quickly and easily.

Figure 15A:
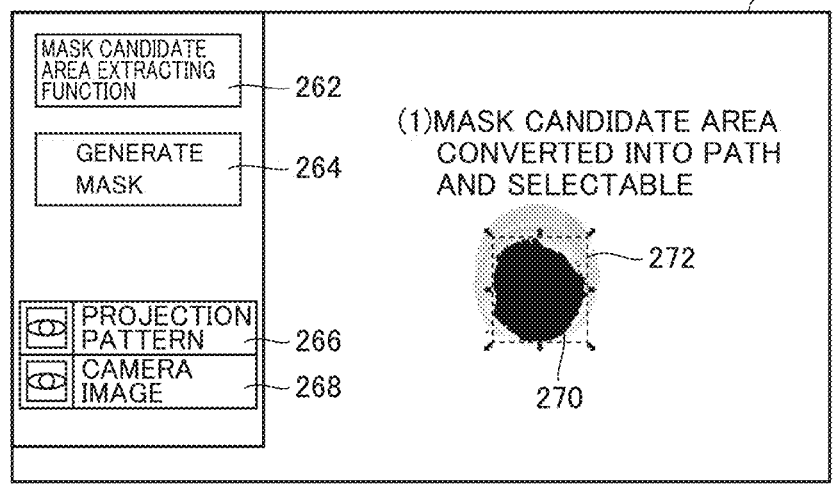
FIGS. 15A and 15B are diagrams showing an example of the user interface for performing the operation of editing a mask candidate area shown in FIGS. 14A to 14D.
Figure 15B:
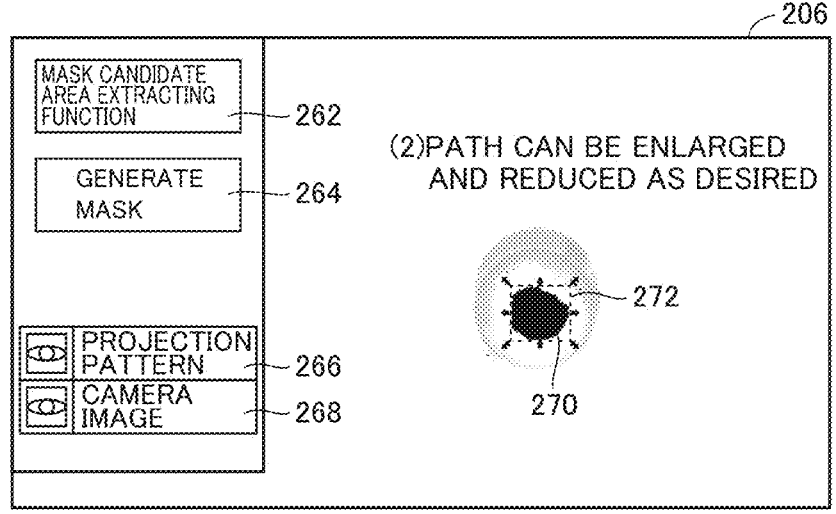

FIGS. 15A and 15B show an example of the user interface for performing an edit operation on the mask candidate area shown in FIGS. 14A to 14D. As shown in FIG. 15A, the extracted mask candidate area may be converted into a path. That is, the boundary (outline) defining a mask candidate area is defined using a set of a plurality of points, from which a desired point can be selected. The user can select one or more points to change the position of the point(s) and thereby change the mask candidate area as desired.

In addition, as shown in FIG. 15B, the area as a whole can be enlarged or reduced as desired by selecting the mask candidate area, that is, the points defining the mask candidate area a whole.

Furthermore, in addition to the operation shown in FIGS. 15A and 15B or in place of the operation shown in FIGS. 15A and 15B, a variety of moving and deforming operations employed in general drawing applications may be employed. In this way, controller 100 receives the operation of changing the shape of the extracted mask candidate area (or mask area).

Figure 16:
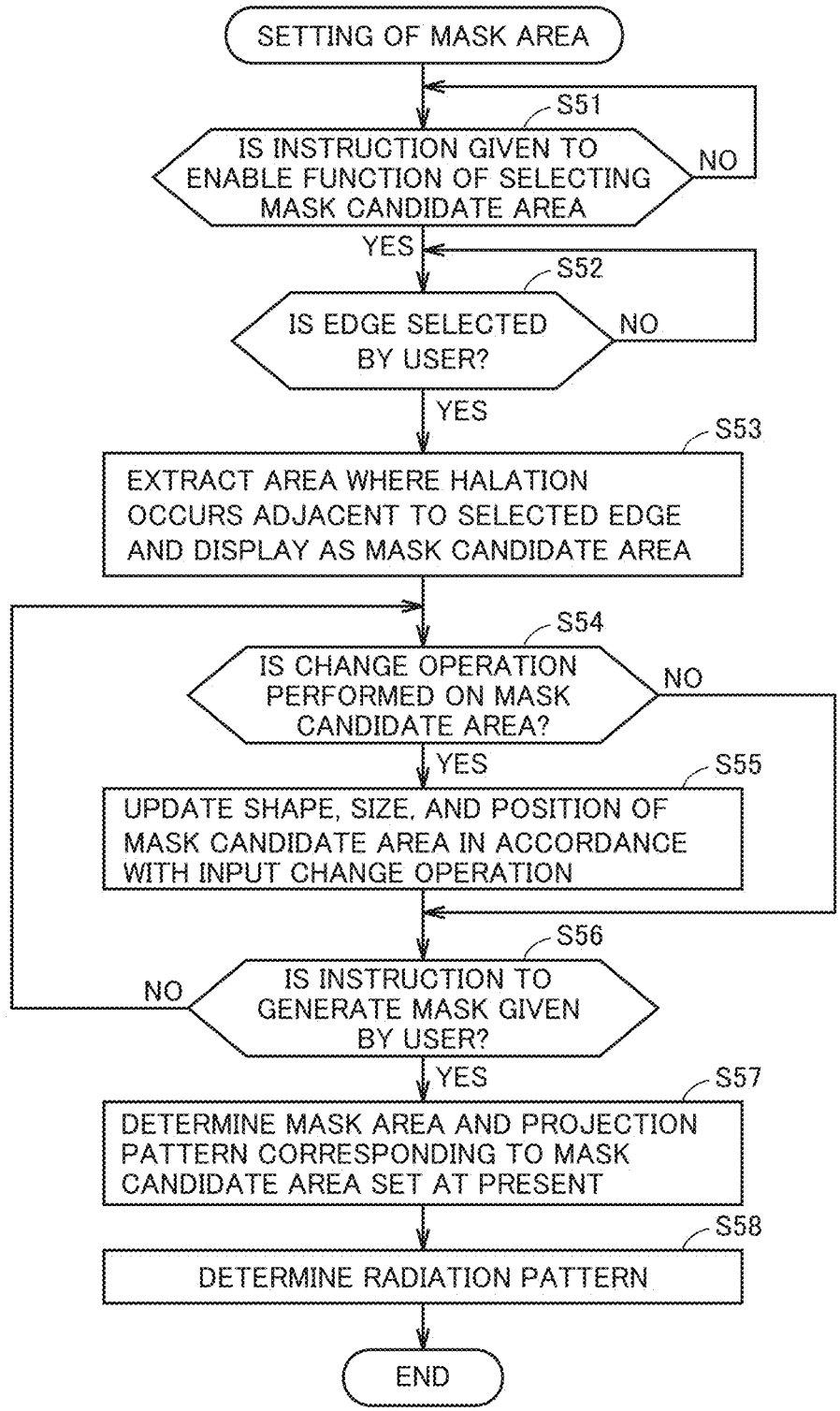
FIG. 16 is a flowchart showing the procedure of mask area setting shown in FIGS. 14A to 14D, 15A, and 15B.

The details of the procedure of setting a mask area as described above are as follows. FIG. 16 is a flowchart showing the procedure of mask area setting shown in FIGS. 14A to 14D, 15A, and 15B. Referring to FIG. 16, controller 100 determines whether an instruction to enable the function of selecting a mask candidate area is given (that is, whether mask candidate area extracting function button 262 is selected) (step S51). If an instruction to enable the function of selecting a candidate area is not given (if NO in step S51), the process in step S51 is repeated.

If an instruction to enable the function of selecting a mask candidate area is given (if YES in step S51), controller 100 determines whether the user selects an edge (step S52). If the user does not select an edge (if NO in step S52), the process in step S52 is repeated.

If the user selects an edge (if YES in step S52), controller 100 extracts an area of halation adjacent to the selected edge and displays the corresponding area as a mask candidate area on user interface screen 206 (step S53). The outline of the extracted area (mask candidate area) is defined as a set of a plurality of points.

Controller 100 determines whether the user performs a change operation on the mask candidate area (step S54). If the user performs a change operation on the mask candidate area (if YES in step S54), controller 100 updates the shape, size, position, and the like of the mask candidate area in accordance with the input change operation (step S55).

If the user does not perform a change operation on the mask candidate area (if NO in step S54), or after step S55 is performed, controller 100 determines whether the user gives an instruction to generate a mask (step S56). If the user gives an instruction to generate a mask (if YES in step S56), controller 100 determines a mask area and a projection pattern corresponding to the mask candidate area set at present (step S57) and determines the corresponding radiation pattern (step S58). The process of setting a mask area then ends.

By contrast, if the user does not give an instruction to generate a mask (if NO in step S56), the process subsequent to step S54 is repeated.

<F. Automatic Mask Region Setting Process>

The process procedure for automatically setting a mask area will now be described. That is, the process in a case where controller 100 automatically sets a mask area included in a projection pattern based on the camera image captured by imaging unit 4 will be described.

Figure 17:
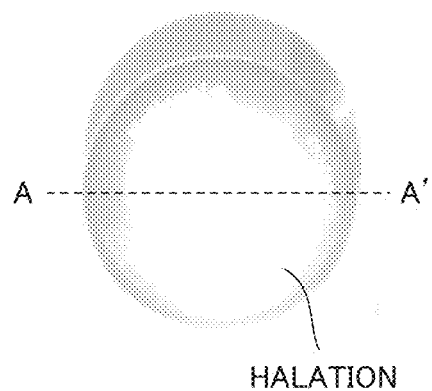
FIG. 17 is a diagram illustrating part of the camera image obtained by the image measurement system according to the present embodiment capturing an image of an object.

FIG. 17 illustrates part of the camera image obtained by image measurement system 1 according to the present embodiment capturing an image of an object. The object shown in FIG. 17 is similar to the object shown in FIGS. 3A and 3B described above. FIG. 17 shows a state in which the object is irradiated with illumination light having a projection pattern in which the quantity of light is uniform. As illustrated with reference to FIGS. 13A and 13B, for example, it is assumed that an area having a relatively high reflectance (high-reflectance area) is present around the center of the object and halation occurs in this part. Here, blur of light causes halation also in the area on the outer periphery side.

On the other hand, if an area including the part with blur of light is set as it is as a mask area, the low-reflectance area that should essentially be irradiated with illumination light would not be irradiated with illumination light, either. Therefore, when a mask area is automatically set, the processing as described below is preferably carried out to determine an optimum range as a mask area.

More specifically, while the illumination light quantity is varied into multiple levels, a mask area is determined based on the state of each camera image captured by imaging unit 4. That is, controller 100 has the function of extracting an area having a pixel value matching a predetermined condition in the camera image that is the image of the field of view, as a mask candidate area. As an example of the technique for determining this predetermined condition, controller 100 determines a threshold, which is an example of the predetermined condition, based on each of camera images captured in a state in which the quantity of illumination light emitted from projector 6 is varied into multiple levels.

Referring to FIGS. 18A to 18C and 19A to 19C, the process procedure for automatically setting a mask area in image measurement system 1 according to the present embodiment will be described.

Figure 18A:
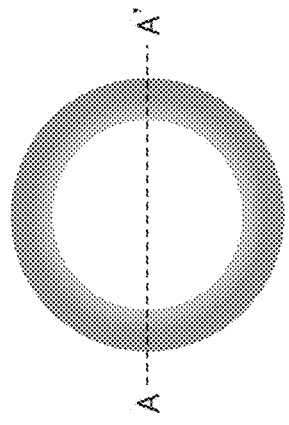
FIGS. 18A to 18C and 19A to 19C are diagrams for explaining the process procedure for automatically setting a mask area in the image measurement system according to the present embodiment.
Figure 18B:
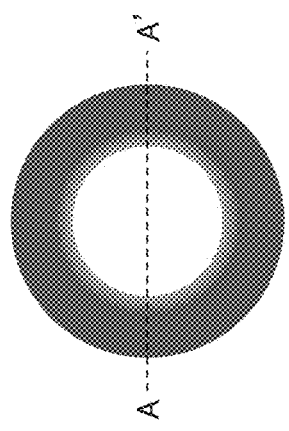
Figure 18C:
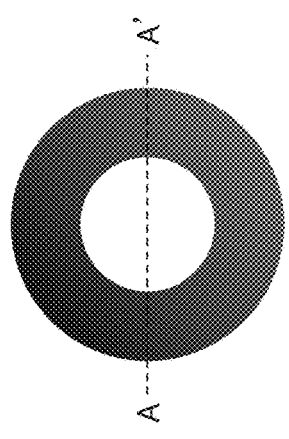

As shown in FIGS. 18A to 18C, when the quantity of illumination light (illumination light quantity) is changed in multiple levels, the area where halation occurs is also changed, and the area from which image information can be acquired is also changed in the camera image, accordingly. In the present embodiment, as an example, a threshold for setting a mask area is determined by evaluating the luminance (luminance profile) on the line A-A' set on the surface of the object.

Figure 19A:
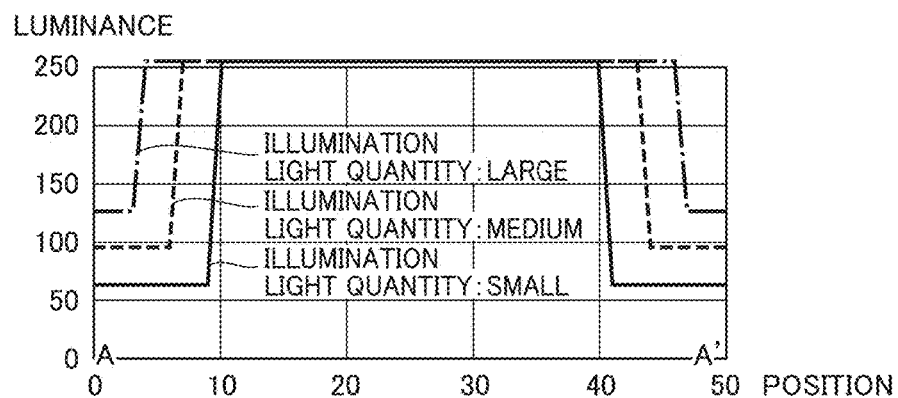
Figure 19B:
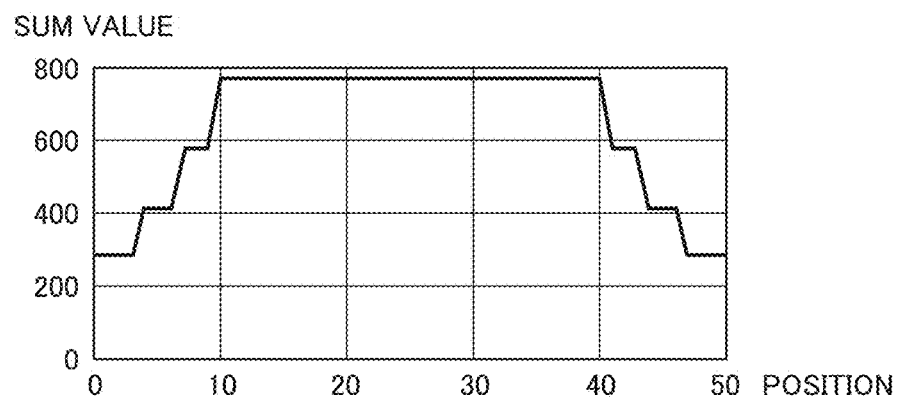
Figure 19C:
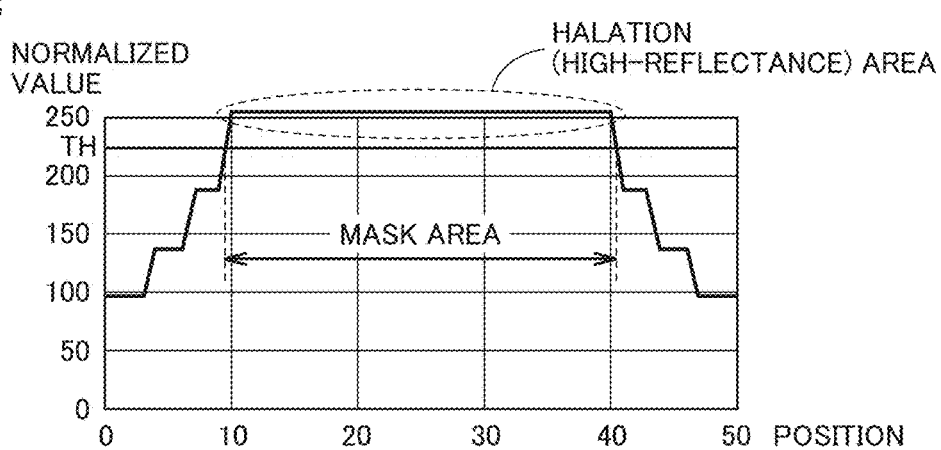

More specifically, as shown in FIG. 19A, the luminance profiles with the illumination light quantity varied into multiple levels are acquired. As shown in FIG. 19B, the average (weighted average) of these luminance profiles is obtained with respect to the same position and then normalized as shown in FIG. 19C. A predetermined threshold TH is applied to the normalized luminance profile shown in FIG. 19C, and an area having a luminance higher than the threshold TH is determined as an area where halation occurs, that is, a high-reflectance area.

Threshold TH may be a predetermined fixed value or may be a value dynamically determined based on the calculated normalized luminance profile. For example, the value of the top 90% of the dynamic range (the range from the smallest value to the largest value) of the normalized luminance profile may be determined as threshold TH.

Figure 20:
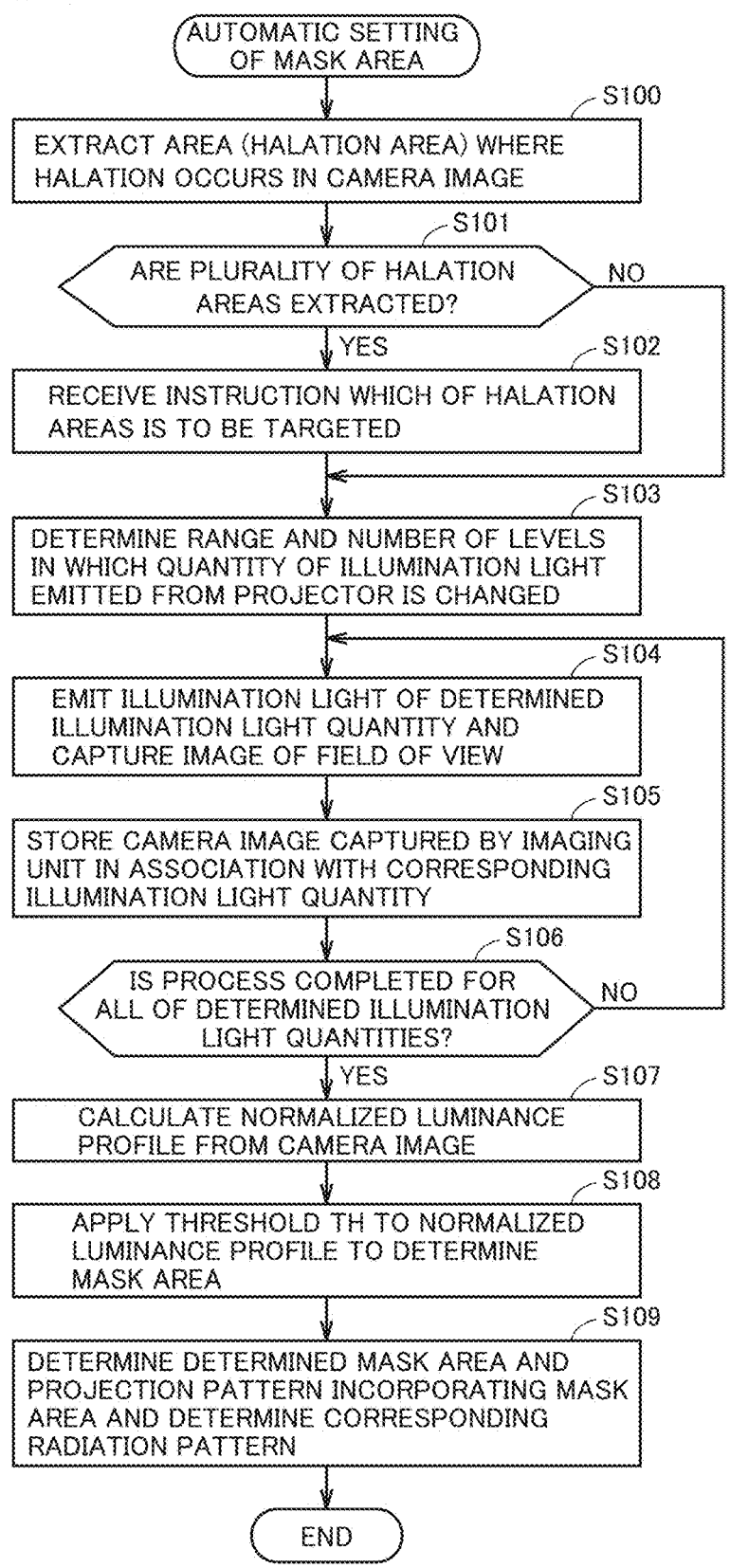
FIG. 20 is a flowchart showing the process procedure of automatically setting a mask area according to the present embodiment.

The details of the process procedure for the automatic setting of a mask area described above are as follows. FIG. 20 is a flowchart showing the process procedure of automatic setting of a mask area according to the present embodiment. The steps shown in FIG. 20 are basically performed by controller 100. The process shown in FIG. 20 may be performed in place of the process in step S3 in FIG. 5 or before the process in step S3.

Referring to FIG. 20, when an instruction to start the process of automatic setting of a mask area is given, controller 100 extracts an area (halation area) where halation occurs in the camera image obtained from imaging unit 4 (step S100). Controller 100 determines whether a plurality of halation areas are extracted (step S101). If a plurality of halation areas are extracted (if YES in step S101), controller 100 receives an instruction as to which halation area is to be targeted from the user (step S102) and determines a target halation area.

Subsequently, controller 100 determines the range and the number of levels in which the quantity of illumination light emitted from projector 6 is changed (step S103). Controller 100 allows projector 6 to emit illumination light of the determined illumination light quantity and allows imaging unit 4 to capture the image of the field of view (step S104). Controller 100 stores the camera image acquired from imaging unit 4 in association with the corresponding illumination light quantity (step S105).

Controller 100 determines whether the processing is completed for all of the determined illumination light quantities (step S106). If the processing is not yet completed for any of the determined illumination light quantities (if NO in step S106), the process subsequent to step S104 is repeated.

If the processing is completed for all of the determined illumination light quantities (if YES in step S106), controller 100 extracts a luminance profile from each of the camera images stored in step S105, and the normalized luminance profile is calculating by calculating the weighted average and normalizing the value (step S107) (see FIGS. 19A to 19C). Controller 100 then applies threshold TH to the normalized luminance profile to specify the halation area and determines the specified halation area as a mask area (step S108). That is, controller 100 extracts an area including a pixel exceeding a predetermined luminance in the image of the field of view captured by the imaging unit in a state in which illumination light is emitted. Controller 100 then determines the area where the quantity of illumination light should be reduced compared with the other area in the field of view, as a mask area, based on the extracted area.

Controller 100 determines the determined mask area and the projection pattern incorporating the mask area and determines the corresponding radiation pattern (step S109). That is, controller 100 updates the radiation pattern in accordance with the determined mask area, based on the correspondence in position (typically, the conversion parameter described above) between the radiation pattern of projector 6 and the projection pattern produced in the field of view by the radiation pattern. With this, the process of automatic setting of a mask area is finished.

In the process of automatic setting of a mask area described above, an optical system and a user interface screen as described below may be used to set the range of the object in the camera image, the target halation area among a plurality of halation areas, and the like.

Figure 21:
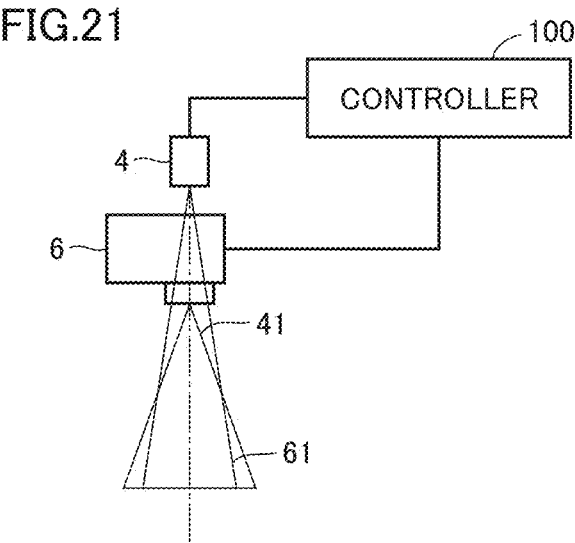
FIG. 21 is a diagram showing an optical system suitable for the process of automatic setting of a mask area in the image measurement system according to the present embodiment.

FIG. 21 shows an optical system suitable for the process of automatic setting of a mask area in image measurement system 1 according to the present embodiment. As shown in FIG. 21, a coaxial optical system having a common optical axis between imaging unit 4 and projector 6 can be employed to facilitate a variety of settings for automatically setting a mask area.

FIG. 22 shows an example of the user interface directed to the process of automatic setting of a mask area in image measurement system 1 according to the present embodiment. Referring to FIG. 22, a user interface screen 208 includes an edit window 270. Edit window 270 displays the camera image captured by imaging unit 4 and the range of area 272 from which a mask area is to be extracted as set by the user.

User interface screen 208 further includes an extracted area setting field 211. Extracted area setting field 211 has similar components as those in mask area setting field 210 shown in FIGS. 9 to 11 to allow the user to select a desired button from mask area shape selection buttons 212 thereby to specify the shape, position, and the like of area 272 from which a mask area is to be extracted.

When the setting of area 272 is completed, the user selects an auto-extraction button 219. The process of automatic setting of a mask area as shown in FIG. 20 described above is then started. Such user interface screen 208 can be employed to allow the user to set a mask area more easily.

The process of automatic setting of a mask area as described above can be used to allow even users not having expertise in image measurement to determine a projection pattern of illumination light more appropriately and quickly.

<G. Setting and Optimization of Mask Region Corresponding to Test Region>

The image measurement system according to the present embodiment is typically intended for such an application that executes image measurement processing (for example, character recognition) on a particular area of the object included in a camera image. In such an application, such a process as to set an area except the target of image measurement processing as a mask area may be preferred rather than locally setting a mask area on an area producing halation.

The process of setting a mask area in accordance with the user setting of an area to be subjected to image measurement processing (hereinafter may be referred to as "test area") will now be described. In addition, the process of dynamically optimizing a mask area will also be described.

In the processes of setting and optimization of a mask area, the technique of HDR (High Dynamic Range) imaging is applied, which improves the dynamic range by combining camera images obtained by capturing images of the same subject with a plurality of different imaging conditions. The embodiment is not limited to the term HDR, and essentially similar techniques can be employed.

Referring to FIGS. 23A to 23C, the process of setting a mask area corresponding to a test area in the image measurement system according to the present embodiment will be described. Referring to FIG. 23A, HDR imaging is performed on an object such as a work arranged in field of view 41 of imaging unit 4. It is assumed that a feature 422 is present in a particular area on the surface of the object. In camera image 410 obtained by HDR imaging, adjustment is made as a whole such that the range of luminance of pixels constituting the image falls within a predetermined gray scale range. As a result, the contrast of the test area including feature 422 is reduced due to the luminance distribution of the image as a whole.

The user specifies an area including feature 422 as test area 420 in camera image 410 captured in FIG. 23A, as shown in FIG. 23B. In response to test area 420 being specified, the entire area except the specified test area is set as mask area 610. Controller 100 receives the setting of test area 420, which is an area to be subjected to image measurement processing, and sets the area except the test area in the field of view as a mask area. A projection pattern corresponding to the set mask area 610 is determined, and illumination light is emitted based on the corresponding radiation pattern. Illumination light based on such a mask area 610 is emitted, whereby substantially test area 420 alone is irradiated with illumination light and the other area is not irradiated with illumination light.

HDR imaging is performed in a state in which test area 420 alone is irradiated with illumination light, whereby camera image 412 as shown in FIG. 23C is acquired. In camera image 412 acquired in a state as shown in FIG. 23C, since the area except test area 420 is not irradiated with illumination light, the contrast of feature 422 alone can be enhanced without being affected by the luminance distribution in the area except test area 420.

In this way, by setting a mask area (that is, projection pattern) in association with test area 420 and capturing an image of an object by HDR imaging, it is possible to enhance the accuracy of image measurement of feature 422 included in test area 420.

In addition, the size and the range of test area 420 may be optimized in accordance with the luminance profile of the object in the camera image. The process of optimizing test area 420 (and mask area 610) will be described below.

Referring to FIGS. 24A to 24C, the process of optimizing a mask area corresponding to a test area in the image measurement system according to the present embodiment will be described. A radiation pattern and a projection pattern are determined in accordance with the mask area generated by the user setting test area 420. An image of the object is then captured by HDR imaging in a state in which illumination light having the determined radiation pattern is emitted, whereby the contrast of test area 420 including at least part of feature 422 can be enhanced as shown in FIG. 24A. The contrast of test area 420 can be defined as the difference between the smallest value and the largest value of the luminance profile of test area 420 (in the example shown in FIG. 24A, contrast C1 of the luminance profile).

Test area 420 can be optimized by evaluating the magnitude of the contrast of the luminance profile.

FIG. 24B shows test area 420 narrowed when compared with FIG. 24A, and FIG. 24C shows test area 420 narrowed when compared with FIG. 24A. Since the area except test area 420 is masked, substantially illumination light is emitted to the area specified as test area 420. With the size and the position of test area 420 adjusted, test area 420 suitable for image measurement processing for the object is searched for.

It is understood that in the state shown in FIG. 24B, contrast C2 has a similar magnitude as contrast C1 in FIG. 24A, whereas in the state shown in FIG. 24C, contrast C3 is significantly increased compared with contrast C1 in FIG. 24A.

In this way, controller 100 has the function of generating a composite image (HDR image) by combining the images captured under a plurality of imaging conditions in a state in which illumination light is emitted in accordance with the radiation pattern corresponding to the set mask area. Controller 100 then evaluates the contrast of the HDR image generated in a state in which illumination light is emitted in accordance with the radiation pattern corresponding to each mask area while at least one of the size and the position of the mask area is changed, thereby optimizing the size and/or the position of the mask area. That is, the size, position, and the like of test area 420 is adjusted so as to achieve the highest contrast.

Figure 25:
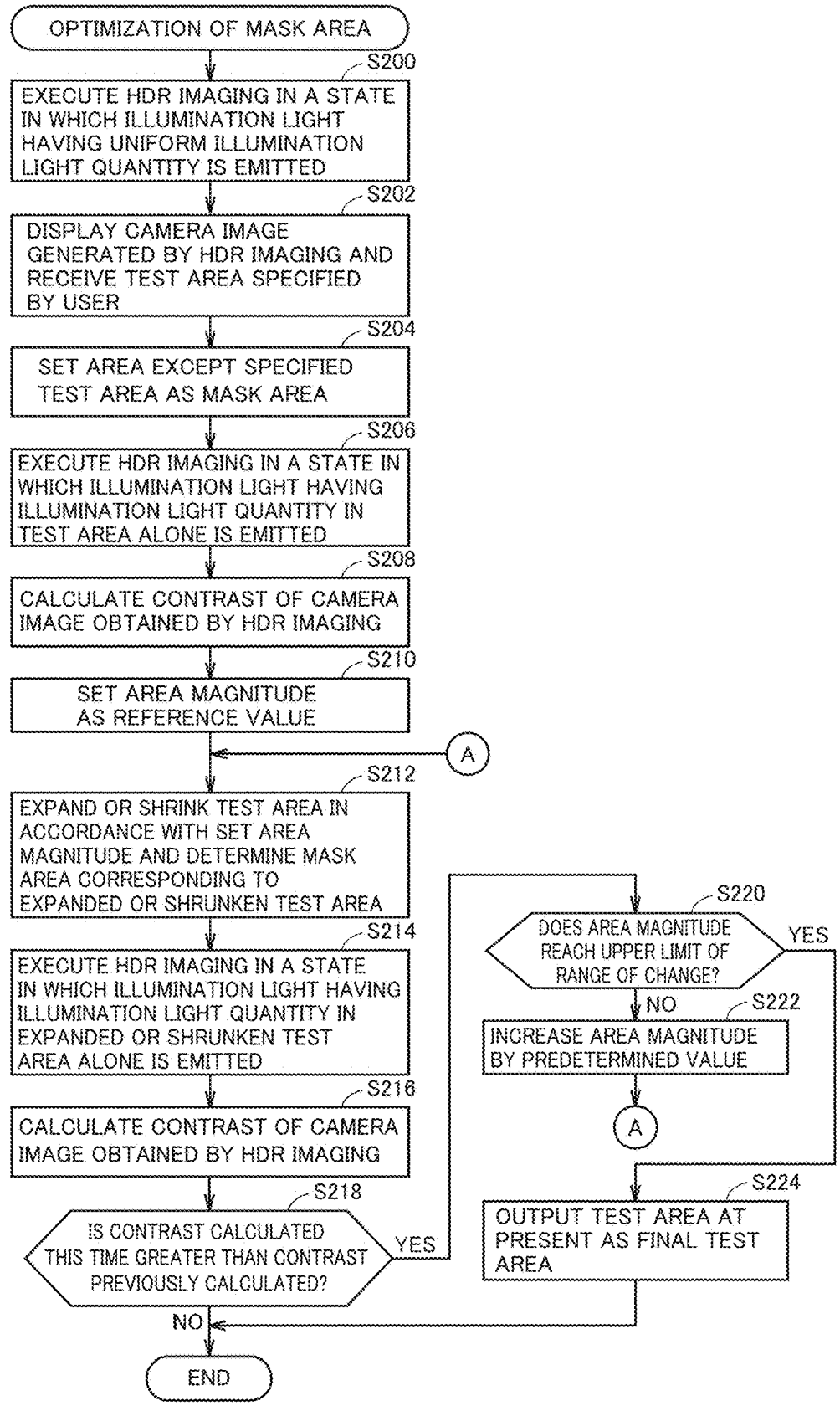
FIG. 25 is a flowchart showing the process procedure of optimizing a mask area corresponding to a test area in the image measurement system according to the present embodiment.

The details of the process procedure for the optimization of test area 420 described above is as follows. FIG. 25 is a flowchart showing the process procedure for optimizing a mask area corresponding to a test area in the image measurement system according to the present embodiment. The steps shown in FIG. 25 are basically performed by controller 100. The process shown in FIG. 25 may be performed in place of the process in step S3 in FIG. 5 or before the process in step S3.

Referring to FIG. 25, when an instruction to start the process for optimization of test area 420 is given, controller 100 executes HDR imaging in a state in which illumination light having a uniform illumination light quantity is emitted from projector 6 to the entire field of view (step S200). More specifically, controller 100 instructs projector 6 to vary the quantity of illumination light into multiple levels and gives imaging unit 4 an instruction to capture an image in a state in which illumination light of each illumination light quantity is emitted. Controller 100 then outputs the result of combination of the camera images captured by imaging unit 4 as a camera image by HDR imaging.

Subsequently, controller 100 displays the camera image by HDR imaging generated in step S200 on display unit 120 and receives test area 420 specified by the user (step S202). When test area 420 is specified, controller 100 sets an area except the specified test area 420 as a mask area (step S204). In accordance with the setting of the mask area, controller 100 updates the projection pattern and the corresponding radiation pattern and instructs projector 6 to emit illumination light based on the updated radiation pattern.

Controller 100 then executes HDR imaging in a state in which illumination light having an illumination light quantity substantially in test area 420 alone is emitted from projector 6 (step S206) and calculates the contrast of the obtained camera image by HDR imaging (step S208).

Subsequently, while test area 420 is expanded or shrunken in order, the HDR imaging and the calculation of contrast are repeated to search for the optimum test area 420. As an example of the method of expanding or shrinking test area 420, in the present embodiment, test area 420 is enlarged or shrunken to a predetermined magnification with reference to a rectangle (circumscribed rectangle) circumscribing test area 420. For example, the size of the circumscribed rectangle encompassing test area 420 set by the user is set as 100% and may be changed in a range from 80% to 120%.

In such a search process, controller 100 sets the magnification (hereinafter which may be referred to as "area magnification") that defines the reduction ratio or the enlargement ratio relative to the reference circumscribed rectangle, as a reference value (for example, 80%) (step S210). Controller 100 then expands or shrinks test area 420 in accordance with the set area magnification and determines a mask area in accordance with the expanded or shrunken test area 420 (step S212). Controller 100 updates the projection pattern and the corresponding radiation pattern in accordance with the determined mask area and instructs projector 6 to emit illumination light based on the updated radiation pattern.

Subsequently, controller 100 executes HDR imaging in a state in which illumination light having an illumination light quantity substantially in the expanded or shrunken test area 420 alone is emitted (step S214) and calculates the contrast of the obtained camera image by HDR imaging (step S216). Controller 100 then determines whether the contrast calculated in step S216 is greater than the contrast calculated in the previous calculation process (step S218).

If the contrast calculated this time is greater than the contrast previously calculated (if YES in step S218), controller 100 determines whether the area magnification reaches the upper limit in the range of change (step S220). If the area magnification does not reach the upper limit in the range of change (if NO in step S220), controller 100 increases the area magnification by a predetermined value (step S222) and repeats the process subsequent to step S212.

By contrast, if the area magnification reaches the upper limit in the range of change (if YES in step S220), controller 100 outputs test area 420 at present as the final test area (step S224). The process for optimization of test area 420 then ends.

On the other hand, if the contrast calculated this time is smaller than the contrast previously calculated (if NO in step S218), controller 100 resets test area 420 at present to the previous test area 420 (step S226) and then outputs the previous test area 420 as the final test area (step S228). The process for optimization of test area 420 then ends.

Finally, controller 100 determines a mask area based on the finally output test area 420 and updates the projection pattern and the radiation pattern incorporating the mask area.

As described above, the process of automatically optimizing test area 420 (that is, mask area) based on the contrast can be employed to allow even users not having expertise in image measurement to enhance the accuracy of image measurement.

<H. Setting of Plurality of Mask Regions/Plurality of Illumination Light Quantities>

In the following, a method of setting one or more mask areas as desired and a method of setting the illumination light quantity for each of a plurality of mask areas will be described.

Figure 26A:
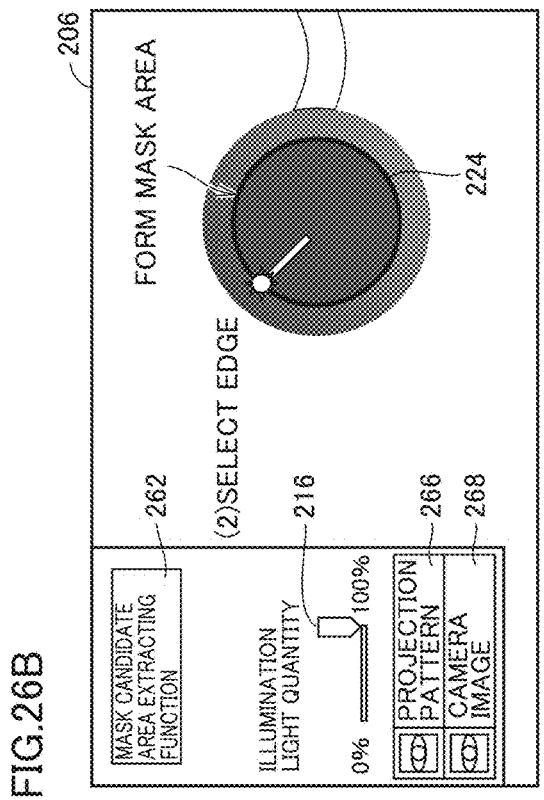
FIGS. 26A to 26D are diagrams for explaining an operation example for setting a plurality of mask areas in the image measurement system according to the present embodiment.
Figure 26B:
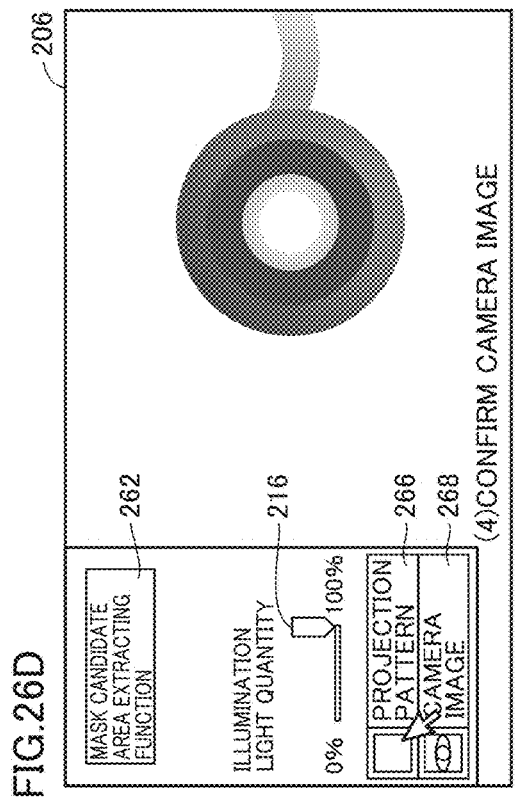
Figure 26C:
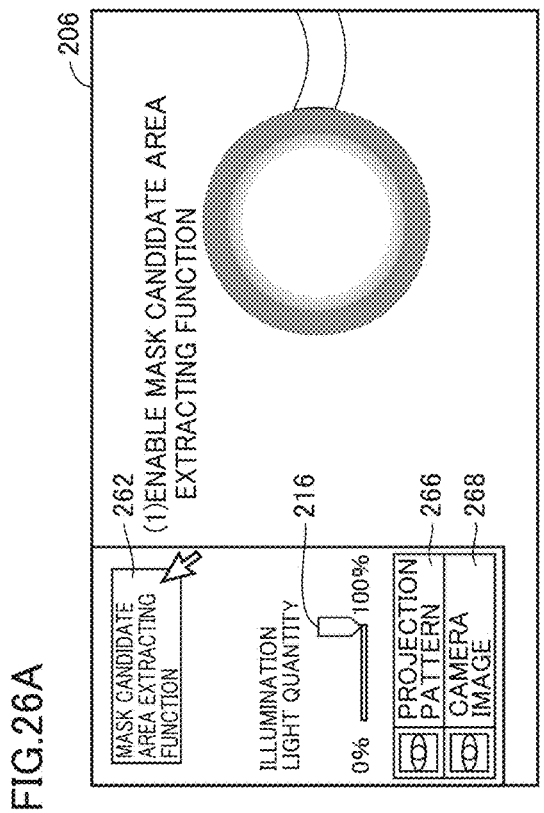

Referring to FIGS. 26A to 26C, an example of the operation for setting a plurality of mask areas in image measurement system 1 according to the present embodiment will be described. In the case shown in FIGS. 26A to 26D, user interface screen 206 shown in FIGS. 14A to 14D described above is used.

First, as shown in FIG. 26A, the user selects mask candidate area extracting function button 262 and enables the function of selecting a mask candidate area ((1) in FIG. 26A). Subsequently, when the user selects an edge defining the boundary of a mask candidate area in the displayed camera image ((2) in FIG. 26B), an area (typically, halation area) having a relatively high luminance in the vicinity of the selected edge is extracted as candidate area 224 (forming a mask area), as shown in FIG. 26B.

When the user additionally selects an edge defining the boundary of another mask candidate area in the displayed camera image ((2) in FIG. 26C), another area having a relatively high luminance in the vicinity of the selected edge is extracted as mask candidate area 226 (forming an additional mask area), as shown in FIG. 26C.

When one or more mask areas are set in accordance with the process procedure as described above, controller 100 defines a projection pattern including these mask areas and calculates a projection pattern from the defined projection pattern.

The process of selecting an edge and forming a mask area as shown in FIGS. 26B and 26C can be repeated any number of times. That is, controller 100 can receive the settings of a plurality of mask areas different from each other.

Figure 26D:
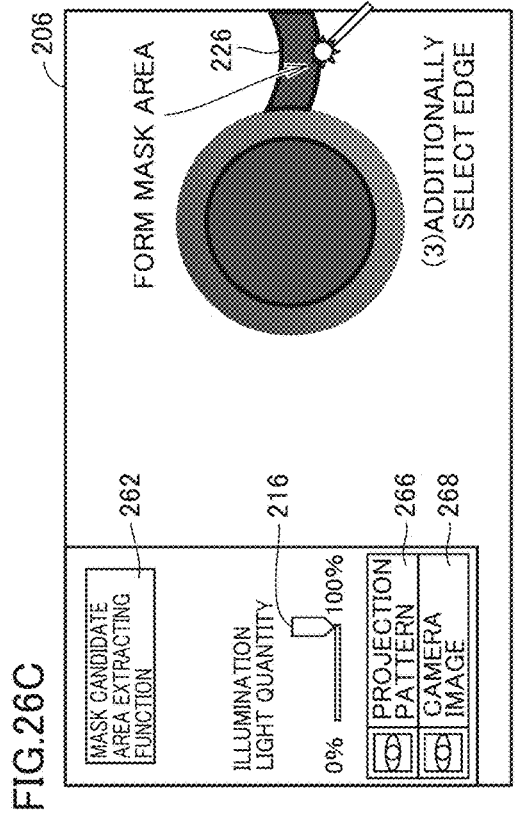

Finally, as shown in FIG. 26D, the user disables the display of the projection pattern and determines whether the mask area is appropriately set by viewing the camera image captured in a state in which illumination light is emitted to the object in accordance with the set mask area.

The area extracted as a mask candidate area or a mask area may be determined based on, for example, the luminance profile in the camera image.

Figure 27A:
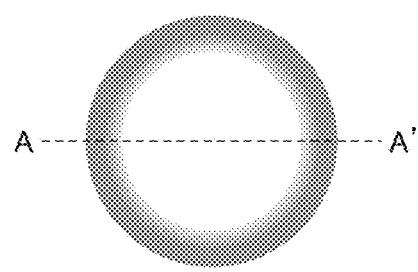
FIGS. 27A and 27B are diagrams for explaining an example of the method of extracting a mask area in the image measurement system according to the present embodiment.
Figure 27B:
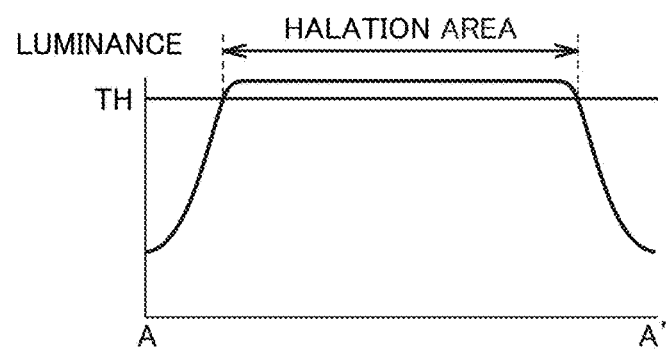

Referring to FIGS. 27A and 27B, an example of the method of extracting a mask area in image measurement system 1 according to the present embodiment will be described. As shown in FIG. 27A, a range in which the luminance (luminance profile) on the line (for example, on line A-A') set on the object in the camera image continuously exceeds predetermined threshold TH may be recognized as a halation area. In the example shown in FIG. 27B, a predetermined range including the central part of the object is determined as a halation area.

For the extracted mask candidate area, the shape, position, range, and the like can be changed as desired through the user operation. That is, controller 100 receives the operation of changing the shape of the extracted mask candidate area.

Referring to FIGS. 28A to 28D, an example of the operation for changing the set mask area in image measurement system 1 according to the present embodiment will be described. As shown in FIG. 28A, the user selects an edge in the camera image to extract a mask candidate area. The user selects the extracted mask candidate area to enable selection of the selected mask candidate area, as shown in FIG. 28B. When a plurality of areas overlap each other (are layered), the area arranged on the upper layer is preferentially selected.

More specifically, in the selected and editable state, an edit circumscribed rectangle 228 circumscribing the mask candidate area appears, and an edit rectangle 229 appears on each vertex of the circumscribed rectangle.

In addition, for the mask candidate area in the selected and editable state, the illumination light quantity also can be changed optionally. That is, controller 100 receives the setting of the magnitude of the quantity of illumination light emitted from projector 6 separately for each of a plurality of set mask areas.

More specifically, as shown in FIG. 28C, the user operates illumination light quantity slider 216 to change the illumination light quantity set for the selected mask candidate area. In accordance with the setting of illumination light quantity for each area, the display (for example, the density value or the display color) of the object indicating the area displayed on display unit 120 (user interface screen) is also changed depending on the setting value of the corresponding illumination light quantity.

Although FIG. 28C shows an example in which the illumination light quantity is changed using illumination light quantity slider 216, a numerical value box or an arrow button may be used to set the illumination light quantity of the selected mask candidate area. The illumination light quantity can be set as desired in a range of 0%-100% relative to the reference illumination light quantity. When the illumination light quantity is 0%, a perfect mask is set, that is, the area is not irradiated with illumination light.

The user can operate rectangles 229 arranged at the vertexes of circumscribed rectangle 228 shown in FIG. 28B to reduce or enlarge the mask candidate area. That is, as shown in FIG. 28D, mask candidate area can be reduced or enlarged vertically and/or horizontally by dragging rectangles 229 at the vertexes of circumscribed rectangle 228 for the selected mask candidate area to a desired position.

As shown in FIGS. 28A to 28D, when a plurality of mask candidate areas (or a plurality of mask areas) are set, the adjacent mask candidate areas may overlap each other. In such a case, the mask candidate area arranged on the upper layer is preferentially set.

Figure 29A:
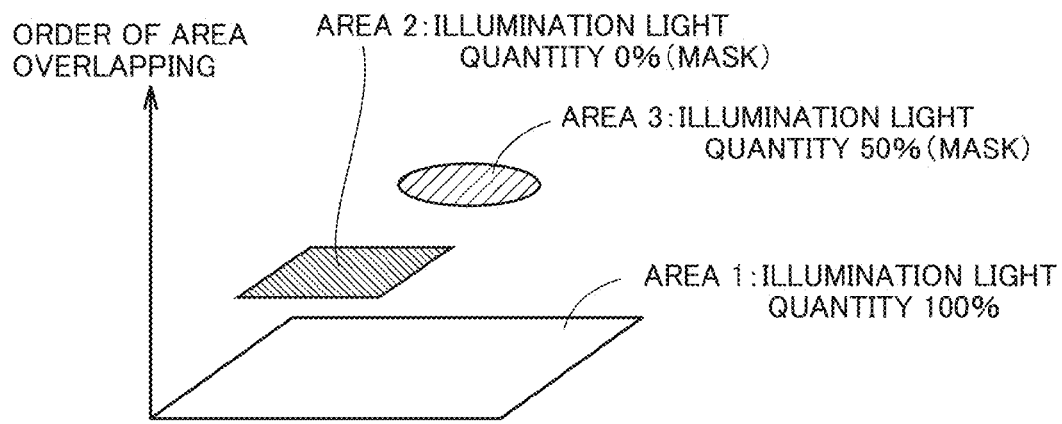
FIGS. 29A and 29B are diagrams for explaining the method of incorporating the quantities of illumination light among a plurality of areas in the image measurement system according to the present embodiment.
Figure 29B:
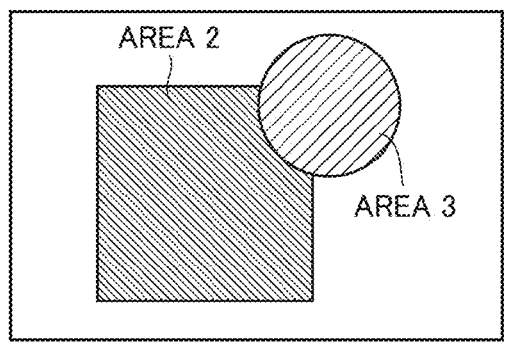

Referring to FIGS. 29A and 29B, a method of incorporating the illumination light quantity among a plurality of areas set in image measurement system 1 according to the present embodiment will be described. FIG. 29A shows an example in which three areas 1, 2, 3 are set. These areas are layered, and their positions in the overlapping direction (order of overlapping) are also defined.

FIG. 29B shows a radiation pattern generated by the setting as shown in FIG. 29A. As shown in FIG. 29B, the illumination light quantity of the area on the top in the order of overlapping is preferentially applied to the part where a plurality of areas overlap.

As described above, in image measurement system 1 according to the present embodiment, one or more mask candidate areas can be set freely, and the illumination light quantity for each mask candidate area can be set independently. Such flexibility in area setting allows the user to set a more appropriate projection pattern depending on, for example, the state of reflectance of the object surface.

<I. Other Embodiments>

Although a plurality of functions have been described in the foregoing embodiment, all of the functions are not necessarily incorporated into a single image processing system and some of the functions may be selectively incorporated. Some of the functions may be combined as appropriate.

<J. Advantages>

In image measurement system 1 according to the present embodiment, a projector scheme is employed in which projector 6 is used to emit illumination light to an object in accordance with a radiation pattern. With such a projector scheme, a radiation pattern with illumination intensity reduced for a particular area is created, and the field of view including the projection pattern produced by the radiation pattern is captured to acquire a camera image to be subjected to image measurement processing. The present embodiment provides, for example, user interfaces that facilitate the settings of projector 6 in such an image measurement system 1.

In particular, since a mask area or a projection pattern can be determined by a plurality of methods, even users not having expertise in image measurement can determine the projection pattern of illumination light more appropriately and quickly.

Such user interfaces can be employed to reduce the illumination light quantity in an area corresponding to a high-reflectance area for an object having a high-reflectance area and a low-reflectance area in the same field of view, thereby enhancing the contrast (visibility) for an area except the high-reflectance area while reducing the effects of halation due to regular reflection by the high-reflectance area.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image measurement system comprising:
a controller comprising a processor and storage;
a projector for emitting illumination light in accordance with a radiation pattern specified from the controller;
an imager operative to capture an image and having a field of view in which an area irradiated with the illumination light exists; and
a display adapted to display an image,
wherein the controller is configured to
display on the display an image of the field of view captured by the imager in a state in which the illumination light is emitted,
receive a setting of a mask area in association with the image displayed on the display, the mask area being an area in which the quantity of illumination light is to be reduced compared with another area in the field of view, and
update the radiation pattern in accordance with the set mask area, based on a correspondence in position between the radiation pattern of the projector and a projection pattern produced in the field of view by the radiation pattern,
wherein the controller is further configured to extract an area having a pixel value matching a predetermined condition in the image of the field of view, as a candidate for mask area, and
wherein the controller is further configured to determine the predetermined condition, based on each of images of the field of view captured in a state in which the quantity of illumination light emitted from the projector is varied into multiple levels.

2. The image measurement system according to claim 1, wherein the controller is configured to display a screen showing the set mask area, in addition to the image of the field of view, in association with a screen of the image of the field of view.

3. The image measurement system according to claim 1, wherein the controller is configured to display an image obtained by combining the set mask area with the image of the field of view, in addition to the image of the field of view.

4. The image measurement system according to claim 2, wherein the controller is configured to display an image obtained by combining the set mask area with the image of the field of view, in addition to the image of the field of view.

5. The image measurement system according to claim 1, wherein the controller is configured to selectively display the image of the field of view and an image obtained by combining the set mask area with the image of the field of view.

6. The image measurement system according to claim 1, wherein the controller is further configured to receive a setting of magnitude of the quantity of illumination light emitted from the projector.

7. The image measurement system according to claim 1, wherein the controller is configured to receive settings of a plurality of mask areas different from each other.

8. The image measurement system according to claim 7, wherein the controller is configured to receive a setting of magnitude of the quantity of illumination light emitted from the projector, separately for each of the plurality of mask areas.

9. The image measurement system according to claim 1, wherein the controller is configured to receive selection of a plurality of predefined shapes and receives specification of size and position of an area having the selected shape.

10. The image measurement system according to claim 1, wherein the controller is configured to receive an operation of changing a shape of the extracted candidate for mask area.

11. The image measurement system according to claim 1, wherein the controller is configured to receive a setting of a test area and sets an area except the test area in the field of view as a mask area, the test area being an area to be subjected to image measurement processing.

12. The image measurement system according to claim 11, wherein
the controller is further configured to
generate a composite image by combining images captured under a plurality of imaging conditions in a state in which illumination light is emitted in accordance with a radiation pattern corresponding to the set mask area and
optimize size and/or position of the mask area by evaluating contrast of a composite image generated in a state in which illumination light is emitted in accordance with a radiation pattern corresponding to each mask area while at least one of size and position of the mask area is changed.

13. The image measurement system according to claim 1, wherein the controller is further configured to allow the projector to emit illumination light in accordance with a predetermined reference radiation pattern and determine the correspondence in the position, based on a projection pattern appearing in an image captured by the imager.

14. A controller, comprising a processor and storage, for use in an image measurement system including a projector for emitting illumination light, a display and an imager operative to capture an image and having a field of view in which an area irradiated with the illumination light exists, the controller configured to:
  instruct the projector to emit illumination light in accordance with a radiation pattern;
  display on the display an image of the field of view captured by the imager in a state in which the illumination light is emitted;
  receive a setting of a mask area in association with the image displayed on the display, the mask area being an area in which the quantity of illumination light is to be reduced compared with another area in the field of view; and
  update the radiation pattern in accordance with the set mask area, based on a correspondence in position between the radiation pattern of the projector and a projection pattern produced in the field of view by the radiation pattern,
  wherein the controller is further configured to extract an area having a pixel value matching a predetermined condition in the image of the field of view, as a candidate for mask area, and
  wherein the controller is configured to determine the predetermined condition, based on each of images of the field of view captured in a state in which the quantity of illumination light emitted from the projector is varied into multiple levels.

* * * * *